United States Patent
Hoshino et al.

(10) Patent No.: US 7,623,176 B2
(45) Date of Patent: Nov. 24, 2009

(54) META-DATA DISPLAY SYSTEM, META-DATA SYNTHESIS APPARATUS, VIDEO-SIGNAL RECORDING/REPRODUCTION APPARATUS, IMAGING APPARATUS AND META-DATA DISPLAY METHOD

(75) Inventors: Hiromi Hoshino, Kanagawa (JP); Fumio Nakajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 880 days.

(21) Appl. No.: 10/809,476

(22) Filed: Mar. 26, 2004

(65) Prior Publication Data
US 2004/0249861 A1    Dec. 9, 2004

(30) Foreign Application Priority Data
Apr. 4, 2003 (JP) ............... P2003-101837

(51) Int. Cl.
*H04N 5/222* (2006.01)
(52) U.S. Cl. .................. 348/333.02; 348/231.3
(58) Field of Classification Search ........... 348/333.02, 348/333.12, 231.2, 231.5, 231.6, 231.3
See application file for complete search history.

(56) References Cited

U.S. PATENT DOCUMENTS

| | | | |
|---|---|---|---|
| 5,592,301 A * | 1/1997 | Shimada | 348/207.99 |
| 6,130,717 A * | 10/2000 | Arai et al. | 348/360 |
| 6,532,039 B2 * | 3/2003 | Anderson | 348/231.3 |
| 6,954,319 B2 * | 10/2005 | Yanagita et al. | 360/46 |
| 2002/0019833 A1 * | 2/2002 | Hanamoto | 707/500 |
| 2002/0040360 A1 * | 4/2002 | Sohma et al. | 707/3 |
| 2004/0174451 A1 * | 9/2004 | Okazaki et al. | 348/333.02 |
| 2005/0104976 A1 * | 5/2005 | Currans | 348/231.5 |

FOREIGN PATENT DOCUMENTS

JP    06-121280    4/1994

(Continued)

OTHER PUBLICATIONS

Japanese Office Action, Application No. 2003-101837.

(Continued)

*Primary Examiner*—Timothy J Henn
*Assistant Examiner*—Gevell Selby
(74) *Attorney, Agent, or Firm*—Rader, Fishman & Grauer PLLC

(57) ABSTRACT

The present invention provides a meta-data display system capable of displaying meta data related to a shot video material along with the video material synchronously to the material. The meta-data display system includes an imaging apparatus for generating a video signal representing the video material. The meta-data display system also has a meta-data synthesis apparatus for extracting at least a part of meta data from the video signal including the meta data added for every frame and synthesizing the extracted part with the video signal. The meta-data display system also includes display apparatus each used for displaying a video signal including meta data synthesized therewith. In such a configuration, a part of meta data added to a video signal is extracted and converted into video data, which is then multiplexed in the video signal of every frame. Thus, the display apparatus are each capable of displaying not only an image represented by a video signal, but also meta data related to the image synchronously with the image.

15 Claims, 18 Drawing Sheets

FOREIGN PATENT DOCUMENTS

| | | |
|---|---|---|
| JP | 9-46627 | 2/1997 |
| JP | 11-187292 | 7/1999 |
| JP | 2000-092419 | 3/2000 |
| WO | WO02/098130 * | 5/2002 |
| WO | WO 02/098130 A2 | 12/2002 |

OTHER PUBLICATIONS

Japanese Office Action issued Oct. 14, 2008 for corresponding Japanese Application No. 2006-016697.

* cited by examiner

FIG. 2

SCENE-INFORMATION GROUP

| ITEM | DATA AMOUNT (BYTES) | CONTENTS |
|---|---|---|
| TIME CODE | 16 | xx:xx:xx:xx |
| DATE | 4 | 2002.10.15 |
| VIDEO-WORK TITLE | 30 | MOON WARS EPISODE V |
| SHOOTING-TEAM NUMBER | 2 | xxxx |
| SCENE NUMBER | 2 | 0003 |
| TAKE NUMBER | 2 | 0017 |
| ROLL NUMBER | 2 | 0005 |
| CAMERAMAN | 16 | BOB MEYERS |
| DIRECTOR | 16 | MIKEL BUSH |
| PRODUCER | 16 | GEORGE JHORDAN |

FIG. 3

CAMERA-SETTING GROUP

| ITEM | DATA AMOUNT (BYTES) | CONTENTS |
|---|---|---|
| CAMERA ID | 4 | 00010335 |
| CHU SWITCH ON/OFF | 1 | ON=1, OFF=2 |
| CCU ID | 4 | 00010750 |
| FILTER SETTING | 2 | 5(A, B, C, D, E) ×5(1, 2, 3, 4, 5) |
| SHUTTER SPEED | 1 | xxxx(1/100/125/250/500/1000/2000) |
| GAIN | 1 | M-90~+99 |
| ECS FUNCTION ON/OFF | 2 | ON=1, OFF=2 |
| GAMMA (MASTER) | 2 | xxx |
| GAMMA (USER SETTING) | 1 | xxx |
| VARIABLE FRAME RATE | 1 | 23.98~30P |
| VIDEO-SIGNAL WHITE LEVEL | 6 | R/G/B/-99~+99 |
| VIDEO-SIGNAL BLACK LEVEL | 8 | R/G/B/M-99~+99 |
| DETAIL LEVEL | 2 | -99~+99 |
| KNEE POINT | 2 | -99~+99 |
| KNEE SLOPE | 2 | -99~+99 |
| RECORDER STATUS | 1 | 23.98~30P |

F I G. 4

LENS-SETTING GROUP

| ITEM | DATA AMOUNT (BYTES) | CONTENTS |
|---|---|---|
| ZOOM | 2 | 7.8~144xxxx |
| FOCUS | 2 | 1~∞xxxx |
| IRIS | 2 | C~1.9xxxx |
| LENS ID | 4 | 00010335 |

F I G. 5

DOLLY-SETTING GROUP

| ITEM | | DATA AMOUNT (BYTES) | CONTENTS |
|---|---|---|---|
| GPS | | 12 | xx:xx:xx/yy/hh |
| MOVEMENT DIRECTION | | 4 | xx' xx' xx'' ANGLE |
| MOVEMENT SPEED | | 4 | xx (m/s) |
| CAMERA DIRECTION | PAN (Z) | 2 | 320° |
| | TILT (Y) | 2 | ±35° |
| | ROLL (X) | 2 | ±35° |
| DOLLY HEIGHT | | 2 | xxx (m) |
| DOLLY ID | | 4 | 00010335 |

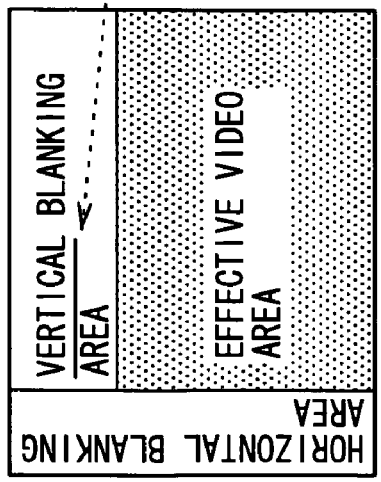
F I G. 6 A
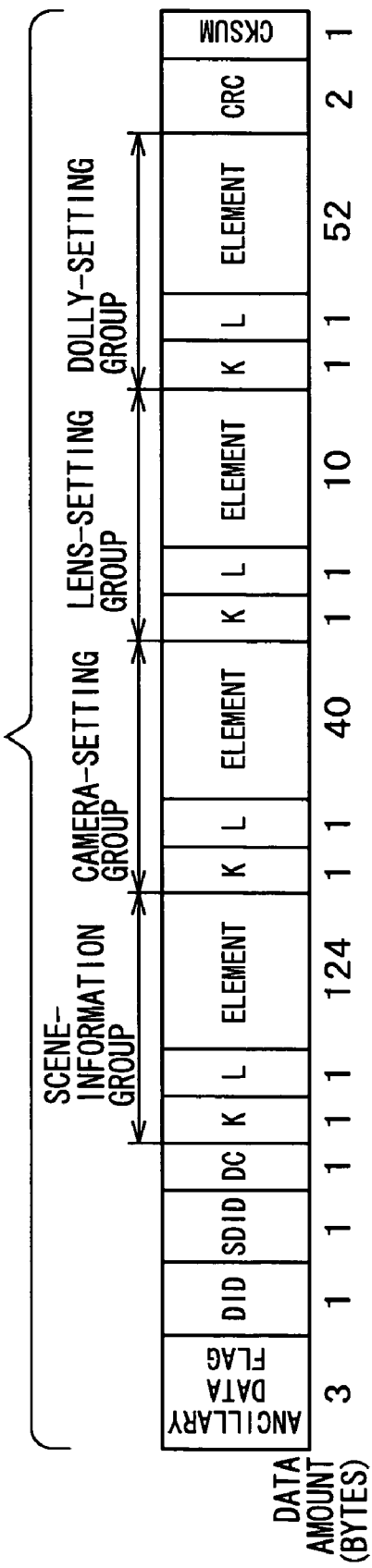
F I G. 6 B

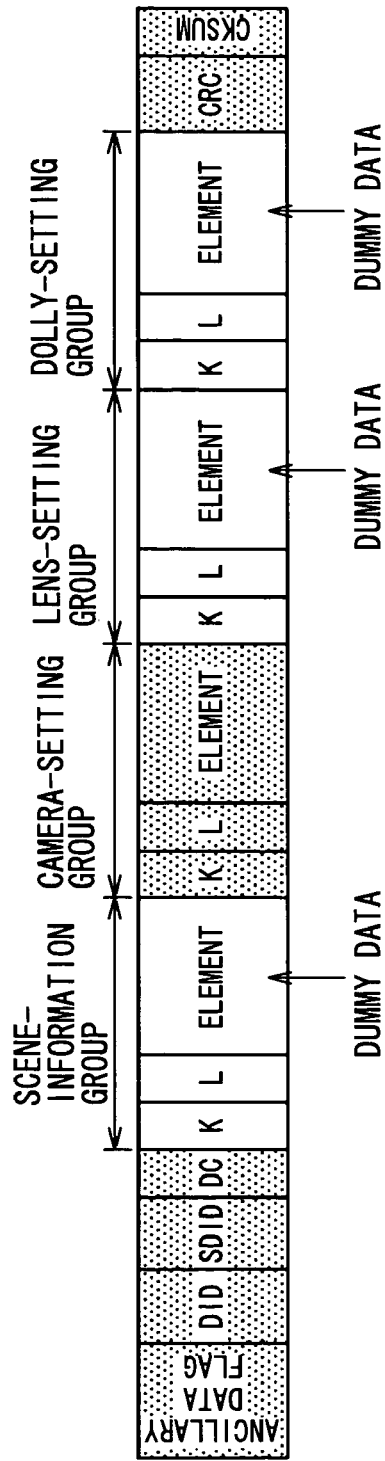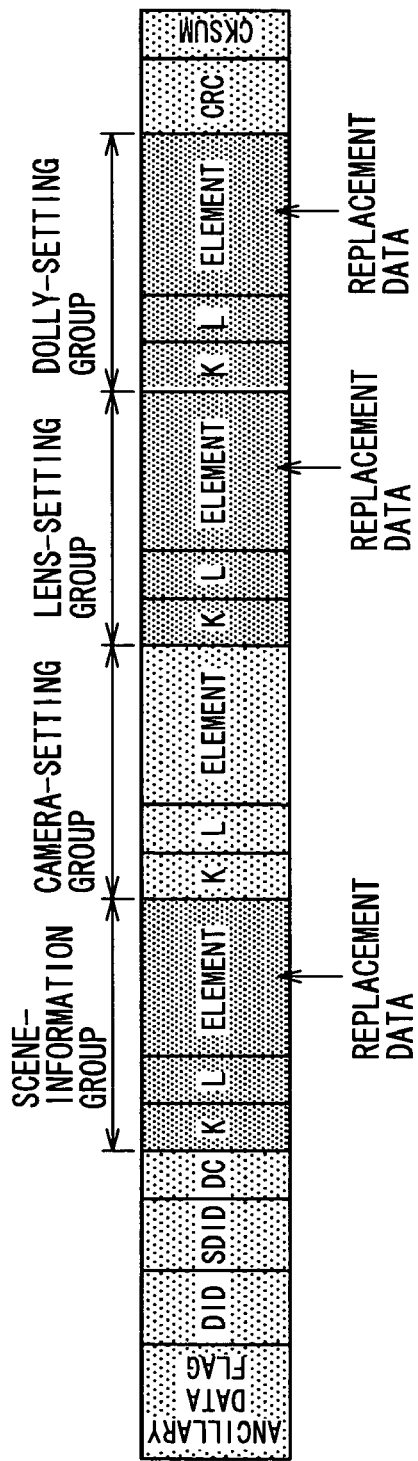

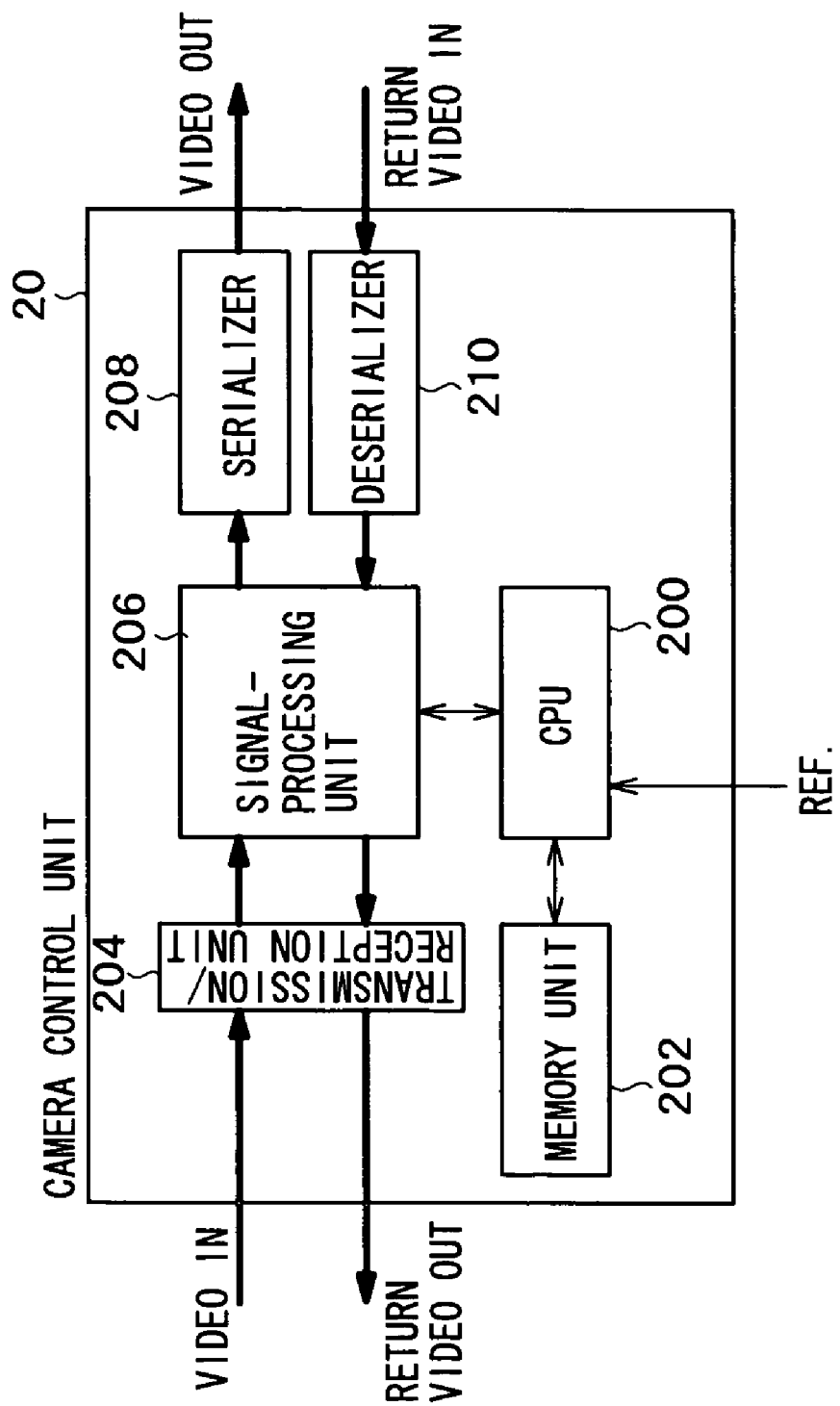

F I G. 1 2
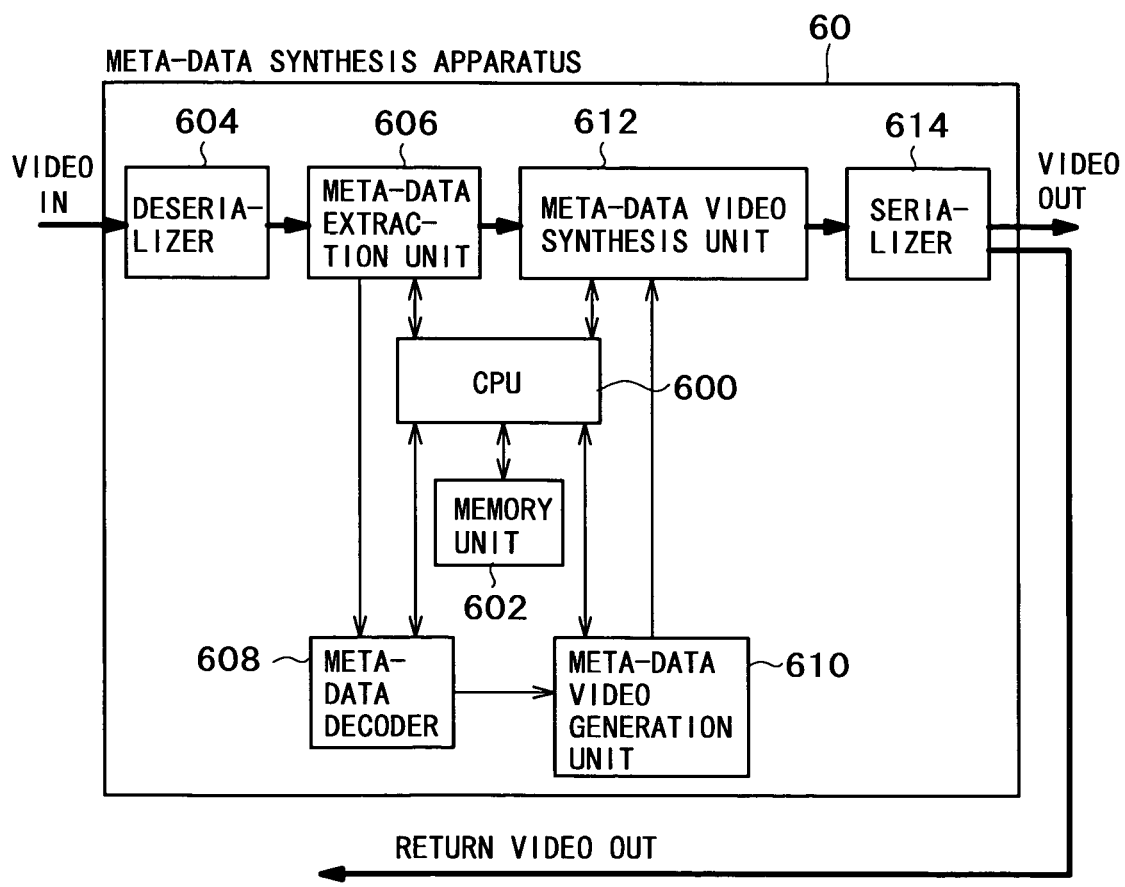

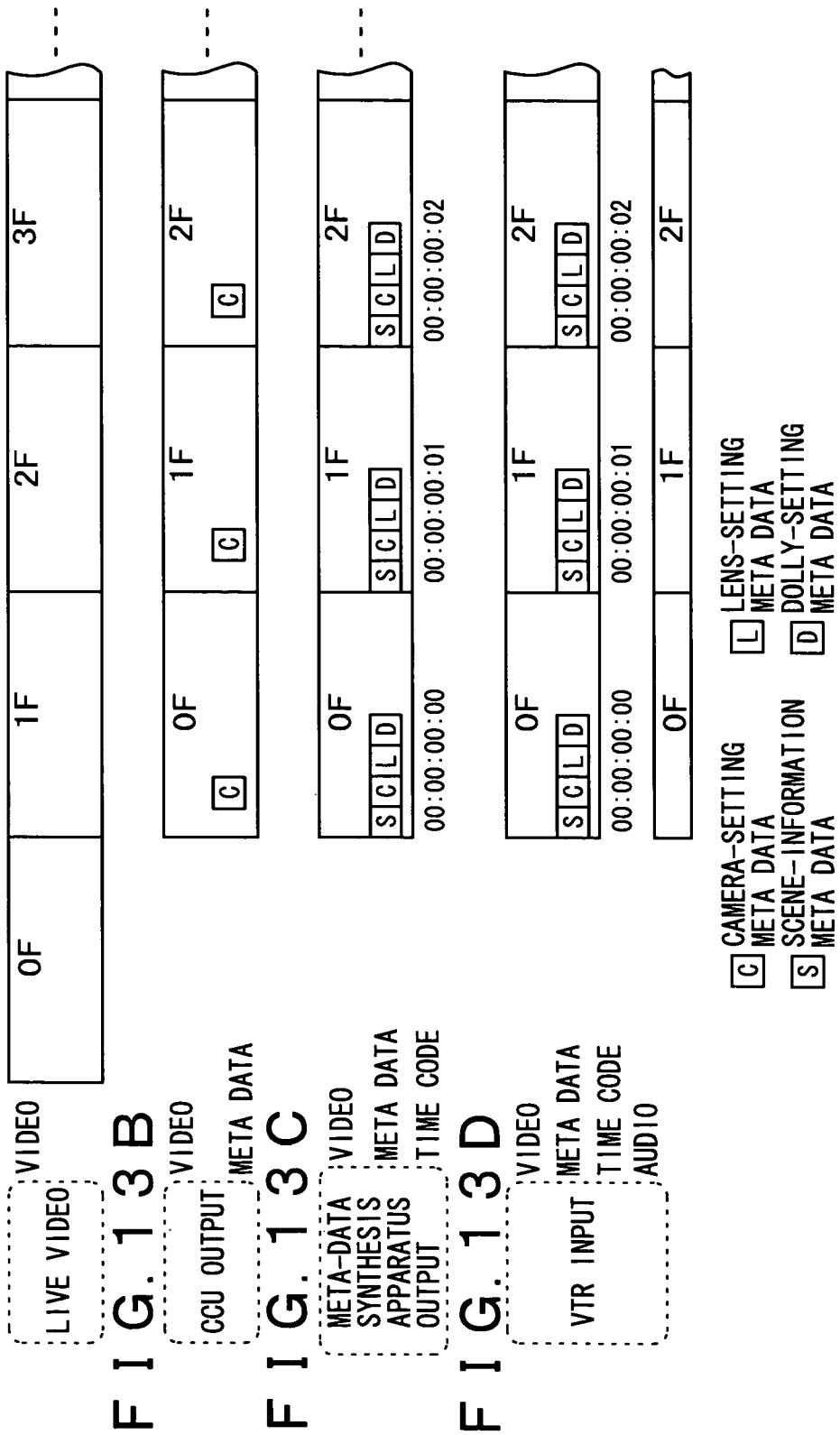

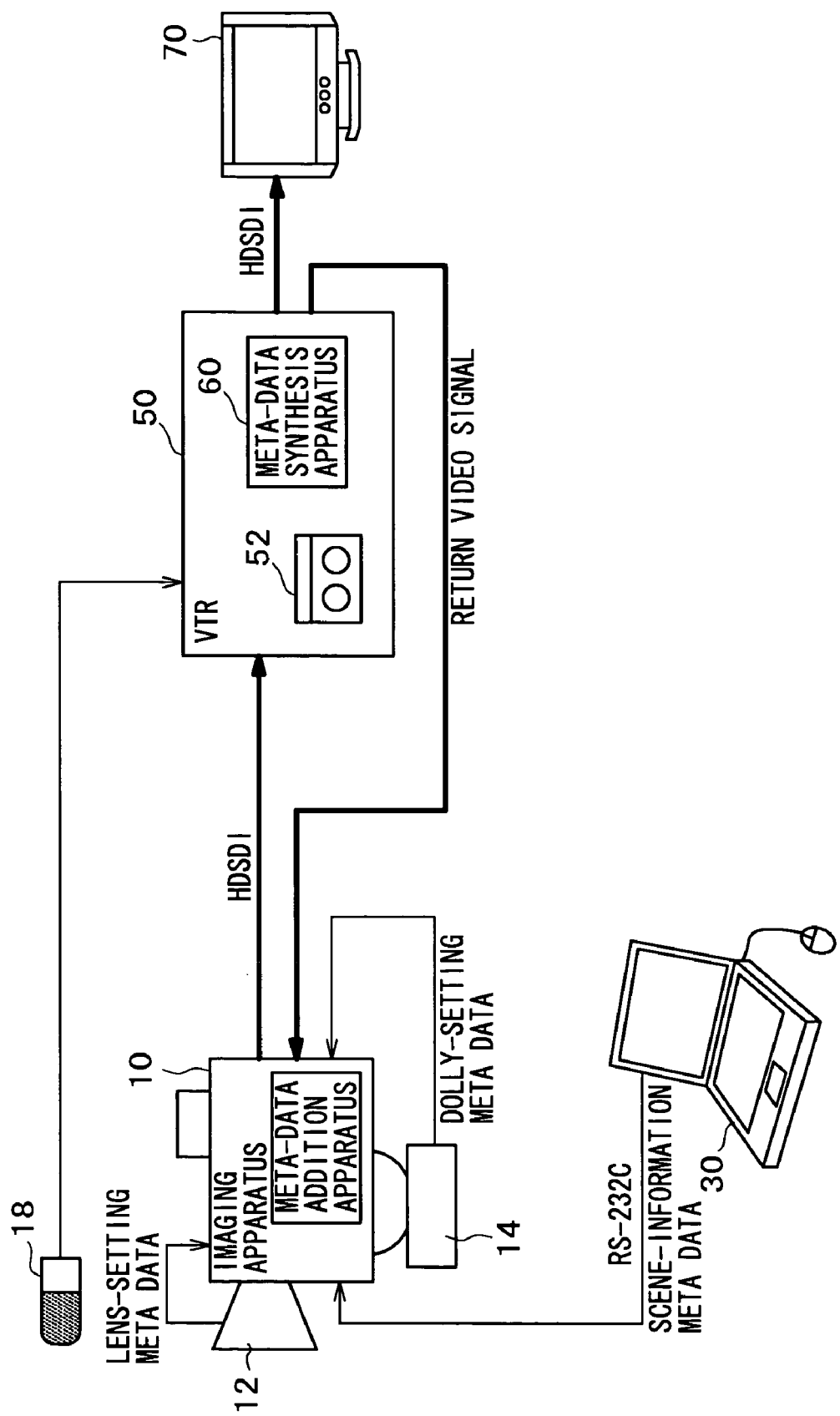

META-DATA DISPLAY SYSTEM, META-DATA SYNTHESIS APPARATUS, VIDEO-SIGNAL RECORDING/REPRODUCTION APPARATUS, IMAGING APPARATUS AND META-DATA DISPLAY METHOD

BACKGROUND OF THE INVENTION

The present invention relates to a meta-data display system for displaying meta data related to a video signal generated in a shooting operation, relates to a meta-data synthesis apparatus, a video-signal recording/reproduction apparatus and an imaging apparatus, which are employed in the meta-data display system, as well as relates to a meta-data display method adopted by the meta-data display system.

In recent years, in the field of producing video works such as movies and TV programs, effective utilization of meta data related to a video material obtained from a shooting operation is promoted. Meta data related to a video material is scene information representing attributes of the video material. The attributes include a scene number, a take number and a time code. Such meta data is referred to as scene-information meta data. The scene-information meta data is information utilized by people such as a cameraman and a director as information useful for identifying and/or managing video materials in the course of a shooting operation or after the shooting operation.

Traditionally, the scene-information meta data is displayed electronically by using typically an electronic slate apparatus or displayed as hand-written data. The electronic slate apparatus displaying scene-information meta data is presented in front of an imaging apparatus at the start point of time and end point of time of a shooting operation and photographed. In this way, the scene-information meta data is directly inserted into positions preceding and succeeding the video material and recorded as video data. For more information, referred to Japanese Patent Laid-open No. Hei 9-46627.

In the case of a shooting operation using a crane or a shooting operation using a steady-cam, however, the electronic slate apparatus cannot be directly presented in front of the imaging apparatus in some cases. In such cases, a shooting operation is carried out in accordance with time codes output by the electronic slate apparatus and a video material is recorded in a recording medium. On the other hand, the scene-information meta data is entered separately from the video material to a terminal such as a personal computer to be recorded therein along with time codes.

However, the conventional method of recording such meta data has a problem that, at the shooting site, the scene-information meta data and the like cannot be displayed synchronously with a video material. To put it concretely, by adoption of the technique to insert data displayed by the electronic slate apparatus into a video material, the meta data is recorded only at positions preceding and succeeding a video material produced in a shooting operation. In addition, with the technique to record meta data and a video material separately, the scene-information meta data and the like are not displayed even if the video material produced in a shooting operation is reproduced.

As a result, people such as a cameraman cannot confirm meta data related to a video material along with the video material in the course of an operation to shoot and record the video material or after the shooting and recording operation. It is thus very much inconvenient for the people such as a cameraman to be incapable of grasping meta data obtained in a shooting operation and checking a video material resulting from the shooting operation.

SUMMARY OF THE INVENTION

It is thus an object of the present invention addressing the problems described above to provide a new and improved meta-data display system capable of displaying meta data synchronously with a video material produced in a shooting operation as meta data related to the video material, and provide a meta-data display method adopted by the meta-data display system.

In accordance with an aspect of the present invention, there is provided a meta-data display system for displaying meta data related to a video signal generated by an imaging apparatus. At least a part of the meta data added to the video signal of every frame is extracted from the video signal and synthesized with the video signal, and the video signal including the synthesized meta data is displayed on a display apparatus.

In the configuration of the meta-data display system described above, at least a part of the meta data added to the video signal of every frame is extracted from the video signal and the extracted part is converted into video data. Then, the video data can be multiplexed in the video signal of every frame. The video data including the video data synthesized therewith in this way is supplied to a display apparatus. Thus, the display apparatus is capable of displaying not only an image taken by the imaging apparatus, but also the meta data related to the displayed image at the same time synchronously with the displayed image. Accordingly, persons such as a cameraman and a director are capable of inspecting the taken image as well as the meta data, grasping the substance of the taken image and confirming the displayed image in the course of a recording operation or after the recording operation.

The display apparatus may be provided in the imaging apparatus. In this configuration, the video data including the video data synthesized therewith is supplied to the imaging apparatus. Thus, a display unit employed in the imaging apparatus typically as a view finder is capable of displaying not only a taken image, but also meta data related to the image at the same time.

The meta data added to the video signal may include scene-information meta data as meta data related to a scene shot by the imaging apparatus. In this configuration, the scene-information meta data including information, which used to be displayed on typically an electronic slate apparatus, can be displayed along with an image represented by the video signal without using the electronic slate apparatus.

The meta data added to the video signal may be packed into one or more meta-data groups provided for different purposes of utilizing the meta data. In this configuration, necessary meta data can be extracted from meta data added to a video signal in meta-data groups and displayed on a display unit. Thus, it is possible to monitor only a meta-data group provided for a utilization purpose all the time.

The meta-data groups may include at least a scene-information group containing information related to a scene shot by the imaging apparatus, a camera-setting group containing setting information of the imaging apparatus, a lens-setting group containing setting information of a lens apparatus employed in the imaging apparatus or a dolly-setting group containing setting information of a dolly apparatus also employed in the imaging apparatus.

For each meta-data group, a group identification unique to a meta-data group added to the video signal may be assigned to the meta data group. In this configuration, it is thus possible to identify a meta-data group on the basis of the group identification. As a result, the process to extract meta data from a video signal in meta-data group units can be carried out at a high speed.

Data-amount information indicating the amount of data contained in a meta-data group may be added to each meta-data group added to the video signal. In this configuration, the amount of data contained in a meta-data group can thus be grasped on the basis of the data-amount information prior to an operation to extract meta data from the meta-data group. As a result, the process to extract meta data from a video signal in meta-data group units can be carried out at a high speed.

The meta-data display system may further have a video-signal recording/reproduction apparatus for recording and reproducing the video signal including the meta data added thereto onto and from a recording medium, and at least a part of the meta data may be extracted from the video signal reproduced by the video-signal recording/reproduction apparatus and synthesized with the video signal. In this configuration, the video-signal recording/reproduction apparatus is capable of recording a video signal, which is generated by the imaging apparatus and then provided with additional meta data for every frame, onto the recording medium. In addition, the video-signal recording/reproduction apparatus is also capable of reproducing the video signal from the recording medium, extracting meta data from the reproduced video signal and synthesizing the extracted meta data with the reproduced video signal. Thus, it is possible to display not only an image, but also meta data related to the image after a recording operation.

In accordance with another aspect of the present invention, there is provided a meta-data synthesis apparatus for extracting at least a part of meta data added to a video signal generated by an imaging apparatus for every frame from the video signal and synthesizing the extracted part with the video signal.

In the configuration of the meta-data synthesis apparatus described above, at least a part of meta data added to a video signal of every frame is extracted and the extracted part is converted into video data. Then, the video data can be multiplexed in the video signal of every frame. Thus, it is possible to provide a meta-data synthesis apparatus required for well implementing the meta-data display system described earlier.

The video signal including the meta data synthesized therewith may be transmitted to the imaging apparatus. In this configuration, the meta-data synthesis apparatus can transmit the video signal as a return image to the imaging apparatus. Thus, a display unit employed in the imaging apparatus is capable of displaying the video signal.

The meta data added to the video signal may include scene-information meta data as meta data related to a scene shot by the imaging apparatus. With this configuration, the meta-data synthesis apparatus is thus capable of extracting scene-information meta data including information, which used to be displayed on the conventional electronic slate apparatus, from the video signal and synthesizing the extracted scene-information meta data with the video signal.

The meta data added to the video signal may be packed into one or more meta-data groups provided for different purposes of utilizing the meta data. In this configuration, the meta-data synthesis apparatus is thus capable of extracting necessary meta data in meta-data group units speedily as well as easily.

In accordance with a further aspect of the present invention, there is provided a video-signal recording/reproduction apparatus including a recording/reproduction unit for recording and reproducing a video signal generated by an imaging apparatus as a video signal with every frame thereof including additional meta data related to the video signal onto and from a recording medium, and a meta-data synthesis apparatus for extracting at least a part of the meta data from the video signal including the meta data added to every frame and synthesizing the extracted part with the video signal.

The meta-data synthesis apparatus may extract at least a part of the meta data from the video signal reproduced by the recording/reproduction unit from the recording medium and synthesizes the extracted part with the reproduced video signal. Thus, an image once recorded can be reproduced and synthesized with meta data.

In accordance with a still further aspect of the present invention, there is provided an imaging apparatus including an imaging unit for taking an image of an object and generating a video signal representing the image, and a display unit for displaying the video signal. The imaging apparatus is connected to a meta-data synthesis apparatus of which at least a part of meta data related to the video signal is extracted from the video signal including the meta data added to every frame and synthesized with the video signal. The imaging apparatus receives from the meta-data synthesis apparatus the video signal including the synthesized meta data and displays the video signal on the display unit.

In the configuration of the imaging apparatus described above, the imaging apparatus is capable of receiving a video signal including meta data synthesized therewith by a meta-data synthesis apparatus as a return image represented by the video signal generated by the imaging apparatus itself. Thus, the imaging apparatus is capable of multiplexing meta data in a reproduced video signal.

In accordance with a still further aspect of the present invention, there is provided a meta-data display method for displaying meta data related to a video signal generated by an imaging apparatus. The meta-data display method includes the steps of extracting at least a part of the meta data added to the video signal of every frame from the video signal and synthesizing the extracted part with the video signal, and displaying the video signal including the synthesized meta data on a display apparatus.

The display apparatus may be provided in the imaging apparatus. Further, the meta data added to the video signal may include scene-information meta data, which is meta data related to a scene shot by the imaging apparatus. Furthermore, it is also possible to adopt the meta-data display method in a configuration wherein the meta data added to the video signal is packed into one or more meta-data groups provided for different purposes of utilizing the meta data.

The meta-data display method may include the steps of reproducing the video signal including the meta data added thereto from a recording medium, and extracting at least a part of the meta data from the video signal reproduced from the recording medium and synthesizing the extracted part with the reproduced video signal.

BRIEF DESCRIPTION OF THE DRAWINGS

FIG. 2 is an explanatory diagram showing an example of scene-information meta data included in a scene-information group in the first embodiment;

FIG. 3 is an explanatory diagram showing an example of camera-setting meta data included in a camera-setting group in the first embodiment;

FIG. 4 is an explanatory diagram showing an example of lens-setting meta data included in a lens-setting group in the first embodiment;

FIG. 5 is an explanatory diagram showing an example of dolly-setting meta data included in a dolly-setting group in the first embodiment;

FIGS. 6A and 6B are explanatory diagrams referred to in describing the format of meta data used in the first embodiment;

FIGS. 8A and 8B are explanatory diagrams showing a configuration of meta data added to a video signal in the first embodiment;

FIG. 9 is a block diagram showing the configuration of a camera control unit employed in the first embodiment;

FIG. 12 is a block diagram showing the configuration of a meta-data synthesis apparatus employed in the first embodiment;

FIGS. 13A to 13D show timing charts used for explaining a video-recording method provided by the first embodiment;

FIG. 18 is a block diagram showing a rough configuration of a meta-data display system including a second typical modified version.

DETAILED DESCRIPTION OF THE PREFERRED EMBODIMENTS

Figure 1:
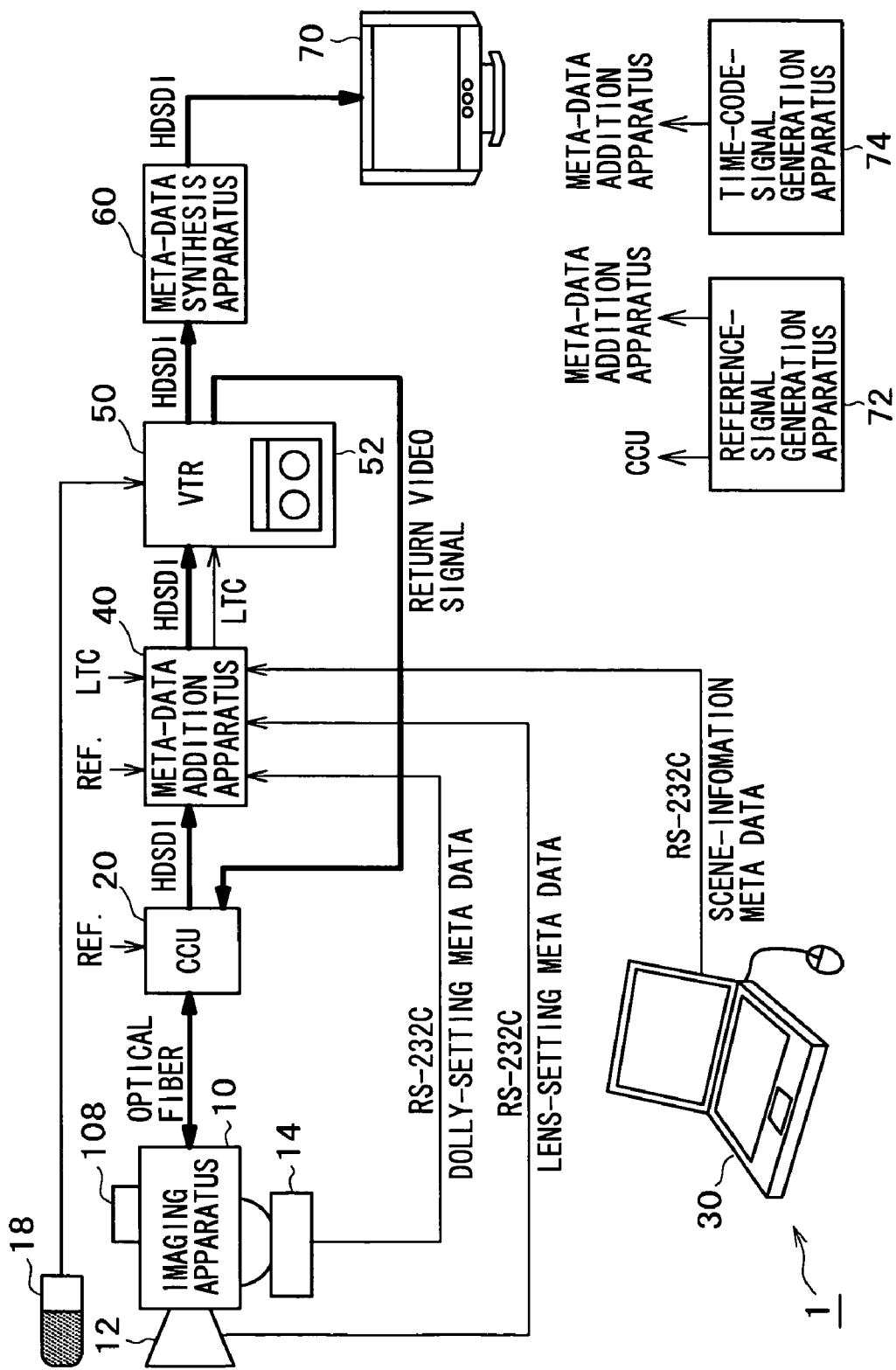
FIG. 1 is a block diagram showing a rough configuration of a meta-data display system implemented by a first embodiment.

Preferred embodiments of the present invention are explained in detail by referring to diagrams as follows. It is to be noted that, throughout this specification and the diagrams, configuration elements having essentially the same functional configuration are denoted by the same reference numeral and an explanation is given only once for all such configuration elements.

First Embodiment

The following description explains a meta-data display system implemented by a first embodiment of the present invention as well as apparatus employed in the system and a method related to the system. The apparatus employed in the meta-data display system include a meta-data synthesis apparatus, a video-signal recording/reproduction apparatus and an imaging apparatus whereas the method related to the system is a meta-data display method.

1: System Configuration

First of all, an outline of the meta-data display system implemented by the first embodiment is explained. A typical meta-data display system implemented by the first embodiment is a video-recording system for shooting and recording video content data.

This video-recording system is used typically by a TV broadcasting station and a company producing video works such as a video content, a TV program and a movie as a system for producing video works. Typically installed at a shooting site such as a shooting studio or a shooting location, this video recording system is capable of shooting and recording video content data of a video material composing a video work. The video content data is content data typically including video data and/or audio data. Generally speaking, the video data is typically moving-picture data. However, the video data may also include still-picture data such as a drawing, a photo and a painting.

the video-recording system is also capable of generating various kinds of meta data related to a video material produced in a shooting operation. Further, the video-recording system is also capable of grouping the meta data, adding the grouped meta data to a video signal of each of frames composing a video material and recording the meta data onto a recording medium along with the video signal. It is to be noted that this meta data is typically high-order data representing, among others, attributes and outline of the video material or the setting information of the shooting apparatus. The meta data is used as indexes of the video material and information for identifying shooting conditions to mention a few. Details of the meta data will be described later.

The meta-data display system designed as a video-recording system is capable of extracting meta data from a video signal, to which the meta data was added, converting the extracted meta data into video data and synthesizing the video data with the video signal to produce a meta-data-synthesized video signal. In addition, the meta-data display system is characterized in that the meta-data display system is capable of displaying a video signal synthesized with video data of meta data as such on a display unit of an imaging apparatus.

Next, the overall configuration of the meta-data display system implemented by the embodiment is explained by referring to FIG. 1. It is to be noted that FIG. 1 is a block diagram showing a rough configuration of the meta-data display system 1 implemented by the embodiment.

As shown in FIG. 1, the meta-data display system 1 implemented by the embodiment typically includes an imaging apparatus 10, a sound collection apparatus 18, a camera control unit 20, a meta-data input terminal 30, a meta-data addition apparatus 40, a video tape recorder 50, a meta-data synthesis apparatus 60 and a display apparatus 70. The camera control unit 20 is abbreviated hereafter to a CCU 20 and the video tape recorder 50 is abbreviated hereafter to a VTR 50.

The imaging apparatus 10 is typically a video camera for converting an optical image received by a lens apparatus 12 into an electrical signal. Thus, the imaging apparatus 10 is capable of taking the image of an object as well as generating and outputting a video signal representing the image. To be more specific, the imaging apparatus 10 is capable of shooting scenes composing a video work, generating a video signal representing the scenes and outputting the video signal to the CCU 20. This video signal can be generated typically by using either a progressive method or an interlace method.

It is to be noted that, in this embodiment, the video signal is transmitted from the imaging apparatus 10 to the CCU 20 as an optical signal through an optical fiber cable or the like. By transmitting the video signal as an optical signal in this way, the video signal can be transmitted over a distance of typically 1 km, which is longer than the distance of transmission of a signal in an HD SDI (High Definition Serial Digital Interface)

format. Thus, the apparatus such as the imaging apparatus 10, the CCU 20 and the VTR 50 can be installed at locations separated from each other by sufficiently long distances to give a high degree of shooting freedom. However, the configuration of the meta-data display system 1 provided by the present invention is not limited to this embodiment. For example, the imaging apparatus 10 may transmit the video signal through an HD SDI cable or the like. In this case, the CCU 20 is not required. That is to say, the imaging apparatus 10 can transmit a video signal directly to the meta-data addition apparatus 40 or another apparatus.

the imaging apparatus 10 is capable of collecting various kinds of setting information inside the imaging apparatus 10 during typically a shooting operation and generating camera-setting meta data based on the setting information. The setting information is information on shooting conditions such as a shutter speed and a gain. Further, the imaging apparatus 10 is also capable of packing the camera-setting meta data into a group as a camera-setting group and adding the group to the video signal of every frame. Details of these functions will be described later.

Furthermore, the imaging apparatus 10 also receives a return video signal to be described later in detail typically from the meta-data synthesis apparatus 60 through the CCU 20. The imaging apparatus 10 is capable of displaying this return video signal on a display unit 108 for example. The display unit 108 is one of display units for displaying a video signal synthesized with meta data in this embodiment. Details of the display unit 108 will be described later.

Moreover, the imaging apparatus 10 is also provided typically with the lens apparatus 12 cited above and a dolly apparatus 14.

The lens apparatus 12 typically includes a plurality of lenses and a driving apparatus for adjusting, among others, distances among the lenses and diaphragms of the lenses. Thus, the lens apparatus 12 adjusts parameters such as zoom, an iris and a focus to radiate a good optical image to the main body of the imaging apparatus 10. The lens apparatus 12 is capable of generating various kinds of setting information used for example in a shooting operation in the lens apparatus 12 as lens-setting meta data for every frame. The setting information is information on shooting conditions including the zoom, the iris and the focus.

The dolly apparatus 14 is a cart on which the main body of the imaging apparatus 10 is mounted so as to allow the imaging apparatus 10 to be moved. In a shooting operation requiring that the imaging apparatus 10 be moved to approach or leave a shooting object or in a shooting operation requiring that the imaging apparatus 10 be moved to follow the object, for example, the dolly apparatus 14 is used for moving the imaging apparatus 10. Typically, a pulley provided on the bottom of the dolly apparatus 14 is mounted on a rail so that the dolly apparatus 14 can be moved to follow the shooting object at a high speed for example. The dolly apparatus 14 is capable of internally generating various kinds of setting information used for example in a shooting operation as dolly-setting meta data for each frame. The setting information is information on shooting conditions including the position of the dolly apparatus 14 and the orientation of the camera. It is to be noted that the dolly apparatus 14 is not a mandatory apparatus. The dolly apparatus 14 is not necessarily required for example in a configuration where the imaging apparatus 10 is installed on a crane for carrying out a shooting operation from a position above a shooting object or the imaging apparatus 10 is carried on the shoulder of a cameraman performing a shooting operation.

The lens-setting meta data and the dolly-setting meta data, which are generated as described above, are supplied to the meta-data addition apparatus 40 through an RS-232C cable or the like.

The sound collection apparatus 18 is typically a microphone for generating an audio signal and outputting the generated signal. To put it in detail, the sound collection apparatus 18 collects audio information in a shooting operation carried out by using the imaging apparatus 10 and generates an audio signal representing the information. The audio information includes background sounds and voices of actors. The audio signal is output typically to the VTR 50. It is to be noted that the sound collection apparatus 18 can also be employed as a part of the imaging apparatus 10.

The CCU 20 is capable of converting a video signal received from the imaging apparatus 10 through typically an optical fiber cable as an optical signal into a signal in the HD SDI format and outputting the signal in the HD SDI format to the meta-data addition apparatus 40 through an HD SDI cable. In addition, the CCU 20 is also capable of extracting camera-setting meta data from the video signal. Further, the CCU 20 also passes on a return video signal received from the meta-data synthesis apparatus 60 to be described later to the imaging apparatus 10.

It is to be noted that the CCU 20 does not have to be provided as an apparatus separately from the imaging apparatus 10. For example, the CCU 20 can also be embedded in the imaging apparatus 10. In particular, if the imaging apparatus 10 is designed as an apparatus for outputting a video signal in the HD SDI format, for example, the CCU 20 is not a required apparatus.

The meta-data input terminal 30 typically includes an information-processing apparatus such as a personal computer and its peripherals. The meta-data input terminal 30 is capable of generating scene-information meta data on the basis of inputs entered by the user to the meta-data input terminal 30. This scene-information meta data is, for example, meta data related to a scene obtained from a shooting operation carried out by using the imaging apparatus 10. In the conventional shooting operation, the scene-information meta data includes information displayed on an electronic slate apparatus. The information displayed on an electronic slate apparatus includes a scene number and a take number. When a person such as a director enters the scene number of a scene to be used as a shooting object from now on to the meta-data input terminal 30, the meta-data input terminal 30 generates scene-information meta data for the scene number and outputs the meta data to the meta-data addition apparatus 40 through an RS-232C cable or the like. It is to be noted that, by using the meta-data input terminal 30, a person such as a cameraman or a director is capable of entering information such as an additional recording-time comment for a recorded video material as meta data representing a scene situation. An example of the recording-time comment is a memorandum about a shooting situation.

The meta-data addition apparatus 40 is capable of typically adding meta data to a video signal of each frame. To put it in detail, the meta-data addition apparatus 40 inputs typically meta data such as lens-setting meta data, dolly-setting meta data and scene-information meta data from meta-data sources such as the lens apparatus 12, the dolly apparatus 14 and the meta-data input terminal 30 respectively. The meta-data addition apparatus 40 packs the input meta data into a plurality of meta-data groups such as a lens-setting group, a dolly-setting group and a scene-information group, which are intended for different purposes of utilizing the meta data. Then, the meta-data addition apparatus 40 adds the meta data of the lens-setting group, the dolly-setting group and the scene-information group, which are obtained as a result of the packing process, to a video signal received from the CCU 20 by inserting the meta data typically into a blanking area of the video signal of each frame. The meta-data addition apparatus 40 then outputs the video signal including all the meta data to the VTR 50 through typically an HD SDI cable.

It is to be noted that the meta-data addition apparatus 40 also receives a reference signal (reference synchronization signal) and a time code signal (LTC: Linear Time Code signal) from a reference-signal generation apparatus 72 and a time-code-signal generation apparatus 74, respectively. The LTC signal can also be supplied to the VTR 50.

The VTR 50 represents a video-signal recording/reproduction apparatus provided by this embodiment. The VTR 50 is typically capable of recording a video signal received from the meta-data addition apparatus 40 and an audio signal received from the sound collection apparatus 18 onto a recording medium such as a video tape 52. In addition, the VTR 50 is also typically capable of reproducing video and audio signals recorded on the video tape 52. Further, the VTR 50 is typically capable of outputting a video signal received from the meta-data addition apparatus 40 to the meta-data synthesis apparatus 60 as it is and outputting a video signal reproduced from the video tape 52 to the meta-data synthesis apparatus 60.

As described above, in this embodiment, the video tape 52 is used as a recording medium. It is to be noted, however, that the configuration of the present invention is not limited to this embodiment. For example, it is also possible to use any one of a variety of recording mediums such as a magnetic tape, a magnetic disk, an optical disk and a memory card. In addition, the video-signal recording/reproduction apparatus provided by this embodiment is not limited to the VTR 50. That is to say, the VTR 50 can be replaced with an apparatus for these various recording mediums. Examples of such an apparatus are a disk apparatus and a variety of readers/writers.

The meta-data synthesis apparatus 60 is an apparatus unique to this embodiment. As described above, the meta-data synthesis apparatus 60 is a decoder for extracting meta data from a video signal, decoding meta data and synthesizing meta data with a video signal. To put it in more detail, the meta-data synthesis apparatus 60 is capable of extracting all or a portion of meta data added to a video signal of each frame received from the VTR 50. In addition, the meta-data synthesis apparatus 60 is also capable of decoding the extracted meta data into video data and synthesizing the video data with the video signal of each frame. The video data of meta data is synthesized with the video signal by superimposition of the video data on typically the video signal of each frame.

The meta-data synthesis apparatus 60 is capable of outputting typically a meta-data-synthesized video signal to the display apparatus 70 and the CCU 20 through an HD SDI cable or the like. The meta-data-synthesized video signal is a video signal including meta data synthesized therewith as described above. A meta data transmitted to the imaging apparatus 10 by way of the CCU 20 functions typically as a return video signal. That is to say, the return video signal is a video signal returned from the meta-data synthesis apparatus 60 to the imaging apparatus 10 after being recorded in typically the VTR 50.

In this way, the meta-data synthesis apparatus 60 is capable of returning a meta-data-synthesized video signal to the imaging apparatus 10 as a return video signal typically in a configuration of distributing the function of a monitoring system. Thus, on the basis of the returned meta-data-synthesized video signal, the imaging apparatus 10 is capable of displaying an image with meta data superimposed thereon on the display unit 108.

The display apparatus 70 is a display apparatus of typically an LCD (Liquid Crystal Display) or CRT (Cathode Ray Tube) type. On the basis of the meta-data-synthesized video signal returned from the meta-data synthesis apparatus 60, the display apparatus 70 is capable of displaying an image with meta data superimposed thereon.

2: Contents of Meta Data

Next, meta data grouped in this embodiment is explained in detail. In this embodiment, various kinds of meta data related to a video material as described above are packed into typically four different meta-data groups intended for different purposes of utilizing the meta data, and the groups are transmitted, recorded and managed. The following description explains details of the contents of meta data contained in each of the four meta-data groups.

2.1: Scene-Information Group

First of all, scene-information meta data included in a scene-information group is explained in detail by giving an example shown in FIG. 2. It is to be noted that FIG. 2 is an explanatory diagram showing an example of scene-information meta data included in a scene-information group in this embodiment.

As shown in FIG. 2, the scene-information meta data included in a scene-information group includes various kinds of meta data related to a scene as meta data obtained in a shooting operation by using the imaging apparatus 10. The scene-information meta data included in a scene-information group includes main information such as a time code, a scene number and a take number, which used to be displayed typically on the conventional electronic slate apparatus.

'Time code' is time information expressed in terms of hours, minutes, seconds and a frame number, which are represented by typically an LTC. Traditionally, the time code is recorded typically on an audio track of a video tape 52 in the longitudinal direction. In this embodiment, this time code is generated by the time-code-signal generation apparatus 74 and added to typically a blanking area of a video signal of each frame by the meta-data addition apparatus 40. A time code is used for identifying a location in the video signal. The amount of data representing a time code is typically 16 bytes.

'Date' is text information expressing a date on which the shooting operation is carried out. The amount of data representing a date is typically 4 bytes.

'Video-work title' is text information expressing the title of a video work. The amount of data representing a video-work title is typically 30 bytes.

'Shooting-team number' is an ID number used for identifying a shooting team (a crew) in charge of the shooting operation. The amount of data representing a shooting-team number is typically 2 bytes.

'Scene number' is a number used for identifying a specific one among a plurality of scenes composing a video work as a specific scene being subjected to a shooting operation. The amount of data representing a scene number is typically 2 bytes. By referring to this scene number, it is possible to recognize a video-work scene to which a video material obtained from a shooting operation corresponds. It is to be noted that a scene can be further divided into fine portions each referred to as a cut and a cut number can be added as scene-information meta data as a number for identifying one of the cuts.

'Take number' is a number for identifying one of takes, which are consecutive video units from a first recording start to a recording end of a recording operation carried out by using the imaging apparatus 10. The amount of data representing a take number is typically 2 bytes. By referring to this scene number, it is possible to recognize a take pertaining to the scene identified by the scene number as a take to which a recorded video signal corresponds.

'Roll number' is a number for identifying one of rolls, which are fine video units obtained as a result of further dividing a take. The amount of data representing a roll number is typically 2 bytes.

'Cameraman', 'Director' and 'Producer' are pieces of text information expressing respectively names of a cameraman, a director and a producer who are persons in charge of the shooting operation. The amount of data representing each of the cameraman, the director and the producer is typically 16 bytes.

As described above, the scene-information group is collected pieces of meta data typically including information on recorded-video attributes and information on video indexes. The scene-information meta data is information useful for grasping contents of a video material as well identifying and managing the video material at typically a video-recording stage, a post-processing stage and an editing stage.

2.2: Camera-Setting Group

Next, camera-setting meta data included in a camera-setting group is explained in detail by giving an example shown in FIG. 3. It is to be noted that FIG. 3 is an explanatory diagram showing an example of camera-setting meta data included in a camera-setting group in this embodiment.

As shown in FIG. 3, the camera-setting meta data included in a camera-setting group includes various kinds of meta data typically including information on setting of the imaging apparatus 10 used for carrying out a shooting operation as main meta data.

'Camera ID' is a serial number (or an apparatus number) used for identifying the imaging apparatus 10 used for carrying out the shooting operation. The amount of data representing the camera ID is typically 4 bytes.

'CHU switch ON/OFF' is bit-information indicating whether or not the setting of the imaging apparatus 10 has been changed from standard setting as will be described later. The amount of data representing the CHU switch ON/OFF is typically 1 byte.

'CCU ID' is a serial number (or an apparatus number) used for identifying the CCU 20 used for carrying out the shooting operation. The amount of data representing the CCU ID is typically 4 bytes.

'Filter setting' is information expressing setting of filters employed in the imaging apparatus 10 used for carrying out the shooting operation. The amount of data representing the filter setting is typically 2 bytes. In this embodiment, two filters of five different kinds are typically employed in the imaging apparatus 10. The filter setting indicates a combination of two filters used in the shooting operation.

'Shutter speed' is information expressing a set value of the shutter speed of the imaging apparatus 10 used for carrying out the shooting operation. The amount of data representing the shutter speed is typically 1 byte. In this embodiment, the shutter speed can be set at a value at any of six stages in the range $\frac{1}{100}$ to $\frac{1}{2,000}$ seconds.

'Gain' is information expressing a set value of the gain of the imaging apparatus 10 used for carrying out the shooting operation. The amount of data representing the gain is typically 1 byte.

'ECS' is information indicating whether the ECS (Extended Clear Scan) function of the imaging apparatus 10 used for carrying out the shooting operation is in ON or OFF status. The amount of data representing the ESC is typically 2 bytes.

'Gamma (master)' is information expressing setting of a gamma characteristic of the imaging apparatus 10 used for carrying out the shooting operation. The amount of data representing the gamma (master) is typically 2 bytes.

'Gamma (user setting)' is information expressing setting of a gamma characteristic with a gamma curve changed in accordance with user setting. The amount of data representing the gamma (user setting) is typically 1 byte.

'Variable frame rate' is information expressing a frame-rate setting value of a video signal generated in a shooting operation carried out by using an imaging apparatus 10 having a variable shooting speed. The amount of data representing the variable frame rate is typically 1 byte. The imaging apparatus 10 provided by this embodiment is capable of shooting an object at a variable frame rate in the range 23.98 to 30 P. However, the present invention is not limited to such an imaging apparatus 10. For example, it is possible to employ an imaging apparatus 10 capable of shooting an object at a variable frame rate in the range 1 to 60 P.

'Video-signal white level' is information expressing a set value of a video signal as a value resulting from a white balance adjustment process of the imaging apparatus 10 used for carrying out the shooting operation. The amount of data representing the video-signal white level is typically 6 bytes.

'Video-signal black level' is information expressing a set value of a video signal as a value resulting from a black balance adjustment process of the imaging apparatus 10 used for carrying out the shooting operation. The amount of data representing the video-signal black level is typically 8 bytes.

'Detail level' is information expressing a set value of a detail level as a value resulting from a detail adjustment process of the imaging apparatus 10 used for carrying out the shooting operation. The amount of data representing the detail level is typically 2 bytes.

'Knee point' is information expressing a set value of a knee point of a video signal compressed by a knee circuit employed in the imaging apparatus 10 used for carrying out the shooting operation. The amount of data representing the knee point is typically 2 bytes.

'Knee slope' is information expressing a set value of a knee slope of a video signal compressed by a knee circuit employed in the imaging apparatus 10 used for carrying out the shooting operation. The amount of data representing the knee slope is typically 2 bytes.

'Recorder status' is information expressing a set value of a frame rate of an operation carried out by the video-signal recording/reproduction apparatus such as the VTR 50 to record a video signal. The amount of data representing the recorder status is typically 1 byte. The recorder status is set in accordance with the variable frame rate described above.

As described above, the camera-setting group is collected pieces of meta data typically including information on shooting conditions such as setting information of an imaging apparatus 10 used for carrying out the shooting operation. The camera-setting meta data is information useful for grasping a picture quality of a video material typically at a post-processing stage of the video material. The picture quality of a video material includes the brightness, tint and texture of the video material to mention a few.

2.3: Lens-Setting Group

Next, lens-setting meta data included in a lens-setting group is explained in detail by giving an example shown in FIG. 4. It is to be noted that FIG. 4 is an explanatory diagram showing an example of lens-setting meta data included in a lens-setting group in this embodiment.

As shown in FIG. 4, the lens-setting meta data included in a lens-setting group includes various kinds of meta data typically including information on setting of the lens apparatus 12 used for carrying out a shooting operation as main meta data.

'Zoom' is information expressing a zoom-setting value obtained as a result of a shooting magnification adjustment process of the lens apparatus 12 used for carrying out the shooting operation. The amount of data representing the zoom is typically 2 bytes.

'Focus' is information expressing a focus setting value set in a focus-distance adjustment process of the lens apparatus 12 used for carrying out the shooting operation. The amount of data representing the focus is typically 2 bytes.

'Iris' is information expressing an iris (diaphragm)-setting value obtained as a result of an exposure adjustment process of the lens apparatus 12 used for carrying out the shooting operation. The amount of data representing the iris is typically 2 bytes.

'Lens ID' is a serial number (or an apparatus number) used for identifying the lens apparatus 12 used for carrying out the shooting operation. The amount of data representing the lens ID is typically 4 bytes.

As described above, the lens-setting group is collected pieces of meta data typically including information on shooting conditions such as setting information of the lens apparatus 12 used for carrying out the shooting operation. The lens-setting meta data is information useful for grasping information such as the movement of a shooting object and the distance from the imaging apparatus 10 from a video material typically at a post-processing stage of the video material.

2.4: Dolly-Setting Group

Next, dolly-setting meta data included in a dolly-setting group is explained in detail by giving an example shown in FIG. 5. It is to be noted that FIG. 5 is an explanatory diagram showing an example of dolly-setting meta data included in a dolly-setting group in this embodiment.

As shown in FIG. 5, the dolly-setting meta data included in a dolly-setting group includes various kinds of meta data typically including information on setting of the dolly apparatus 14 used for carrying out a shooting operation as main meta data.

'GPS' is GPS (Global Positioning System) information including a latitude and a longitude, which are used for determining the position of the dolly apparatus 14 used in the shooting operation, that is, the position of the imaging apparatus 10 used in the shooting operation. The amount of data representing the GPS is typically 12 bytes.

'Movement direction' is information expressing the direction of a movement of the dolly apparatus 14 used for carrying out the shooting operation, that is, the direction of a movement of the imaging apparatus 10 used for carrying out the shooting operation in terms of an angle. The amount of data representing the movement direction is typically 4 bytes.

'Movement speed' is information expressing the speed of a movement of the dolly apparatus 14 used for carrying out the shooting operation, that is, the speed of a movement of the imaging apparatus 10 used for carrying out the shooting operation. The amount of data representing the movement speed is typically 4 bytes.

'Camera direction' is information expressing the shooting direction of the imaging apparatus 10. The information expresses the shooting direction of the imaging apparatus 10 in terms of an angle of rotation (head-shaking angle) of the imaging apparatus 10 with the fixed dolly apparatus 14 taken as a reference. To put it concretely, the shooting direction of the imaging apparatus 10 is expressed in terms of three angles of rotation in three directions, i.e., a pan (an angle of rotation in the Z-axis direction), a tilt (an angle of rotation in the Y-axis direction) and a roll (an angle of rotation in the X-axis direction). The amount of data representing each of the three angles of rotation is typically 2 bytes.

'Dolly height' is information expressing the height of the dolly apparatus 14. The amount of data representing the dolly height is typically 2 bytes. This information is used for determining the position of the imaging apparatus 10 in the vertical direction.

'Dolly ID' is a serial number (or an apparatus number) used for identifying the dolly apparatus 14 used for carrying out the shooting operation. The amount of data representing the dolly ID is typically 4 bytes.

As described above, the dolly-setting group is collected pieces of meta data typically including information on shooting conditions such as setting information of the dolly apparatus 14 used for carrying out the shooting operation. The setting information of the dolly apparatus 14 includes the movement and position of the dolly apparatus 14. Much like the lens-setting meta data, the dolly-setting meta data is information useful for grasping information such as the movement of a shooting object appearing in the video material and the distance of the object typically at a post-processing stage of the video material.

The meta data of the four typical meta-data groups provided by this embodiment has been described above. By packing the meta data into groups as described above, only a proper group of necessary meta data can be extracted, utilized, replaced or subjected to another process in dependence on the purpose of utilization of the meta data.

At a stage of recording video data, for example, for the purpose of identifying or grasping the video data being recorded or completing a recording process, meta data of a scene-information group including a scene number and a time code is extracted and utilized. In addition, at the post-processing stage of a video material, the meta data of the camera-setting, lens-setting and dolly-setting groups is utilized typically in a process to synthesize an actual image with a CG image. To put it concretely, for a typical purpose of grasping the picture quality of the video material, the meta data of the camera-setting group is extracted and utilized. In addition, for a typical purpose of grasping the movement of a shooting object in the video material, the meta data of the lens-setting and dolly-setting groups is extracted and utilized.

It is to be noted that the lens-setting and dolly-setting groups share a common purpose of utilizing their meta data. Thus, instead of separating the lens-setting and dolly-setting groups from each other as is the case with this embodiment, a single lens/dolly-setting group can be created to contain both the lens-setting meta data and the dolly-setting meta data.

3: Format of Meta Data

Next, the format of meta data is explained by referring to FIGS. 6A and 6B. It is to be noted that FIGS. 6A and 6B are explanatory diagrams referred to in describing the format of meta data used in this embodiment.

As described above, meta data used in this embodiment is packed in four different meta-data groups. The groups of meta data are added in a predetermined format to a video signal of each frame in apparatus such as the imaging apparatus 10 and the meta-data addition apparatus 40.

To put it detail, as shown in FIG. 6A, the meta data is inserted typically into an ancillary data area inside a vertical blanking area of a video signal of each frame as packaged ancillary data. FIG. 6B is a diagram showing a format of the packaged meta data as a format adopted typically at a transmission time.

As shown in FIG. 6B, meta data is packed into typically four different groups, i.e., a scene-information group, a camera-setting group, a lens-setting group and a dolly-setting group. The four meta-data groups are arranged consecutively to form a format of a series of the groups. The meta-data groups are subjected to a KLV (Key Length Value) encoding process conforming to SMPTE (Society of Motion Picture and Television Engineers) standards (SMPTE 291M and the like).

K (Key) is a reserved word serving as a key ID added to typically the head of each of the meta-data groups. The key ID has a length of typically 1 byte. Provided as a group identification in this embodiment, this K code functions as a code for identifying the meta-data group containing this K code. In any frame of a video signal, for example, the K code added to a scene-information group always has a value of 01, the K code added to a camera-setting group always has a value of 02, the K code added to a lens-setting group always has a value of 03 and the K code added to a dolly-setting group always has a value of 04. In this way, a group identification unique to each of the meta-data groups can be added to the meta-data group uniformly for all frames. Thus, only a specific meta-data group can be extracted with ease on the basis of the group identification from a plurality of meta-data groups for each frame.

L (Length) is an added length code typically following the K code. The L code has a typical size of 1 byte. Provided as information on the amount of data in this embodiment, this L code functions as a code showing the amount of data included in the meta-data group following the code. For example, assume that the L code added to a scene-information group in a frame is 124. In this case, the amount of data included in the scene-information group in the frame is 124 bytes. By adding the L code indicating the amount of data as information in front of the contents of a meta-data group in this way, the processing efficiency of a process to extract or replace the meta data of the group can be increased. That is to say, by referring to the L code serving as information on the amount of data, apparatus such as the meta-data addition apparatus 40 and the VTR 50 are capable of grasping the amount of the meta data contained in the meta-data group including the L code in advance as meta data to be extracted or replaced. Thus, the processing efficiency of a process to extract or replace the meta data of the group can be increased.

'Element' is a user data area used for actually storing the meta data of a group. Also referred to as a value area, 'Element' has a variable length.

In addition, in front of the meta-data groups completing the KLV encoding process as described above, additional flags used for defining and identifying the type of meta data being transmitted are provided. The additional flags are an ancillary data flag, a DID (Data Identification), an SDID (Secondary Data Identification) and a DC (Data Counter). On the other hand, codes are also added after the meta-data groups completing the KLV encoding process. The codes include a CRC (Cyclic Redundancy Check) code and a 'CHECK SUM'.

By the way, in accordance with the SMPTE standards, meta data that completes a KLV encoding process and is inserted into the ancillary data area of a video signal must be packed into an ancillary-data packet with a size not exceeding 255 bytes. Thus, the format of meta data used in this embodiment must conform to this standard. That is to say, the total size of grouped meta data must be adjusted not to exceed 255 bytes. To put it concretely, for example, the total size of grouped meta data is adjusted so that the amount of meta data in the scene-information group does not exceed a typical value of 124 bytes, the amount of meta data in the camera-setting group does not exceed a typical value of 40 bytes, the amount of meta data in the lens-setting group does not exceed a typical value of 10 bytes and the amount of meta data in the dolly-setting group does not exceed a typical value of 52 bytes. Thus, the size of a packet of ancillary data can be set at a typical value not exceeding 226 bytes, which are the total amount of the meta data.

In this way, the format of meta data used in this embodiment is set so that all the meta data can be accommodated in one ancillary-data packet having a size of 255 bytes. However, the configuration of the present invention is not limited to this scheme. For example, meta data can be divided into a plurality of ancillary-data packets, which are linked to each other to create a package.

As described above, in accordance with the format of meta data used in this embodiment, there is provided a configuration in which an area allocated to meta data is divided typically into as many sub-areas as meta-data groups and meta data of the meta-data groups are inserted into the sub-areas allocated to the meta-data groups. In addition, group identification information and data amount information are added to the head of each of the meta-data groups. With such a configuration, only a meta-data group including meta data required for the purpose of utilizing the meta data can be detected and extracted or replaced speedily as well as easily. For example, by letting the group identification information be shared by recording and editing departments as a common ID, the meta data can be well utilized in a process of producing a video work.

4: Apparatus Configurations

Next, configurations of main apparatus composing the meta-data display system 1 described above are explained in detail.

4.1: Imaging Apparatus

Figure 7:
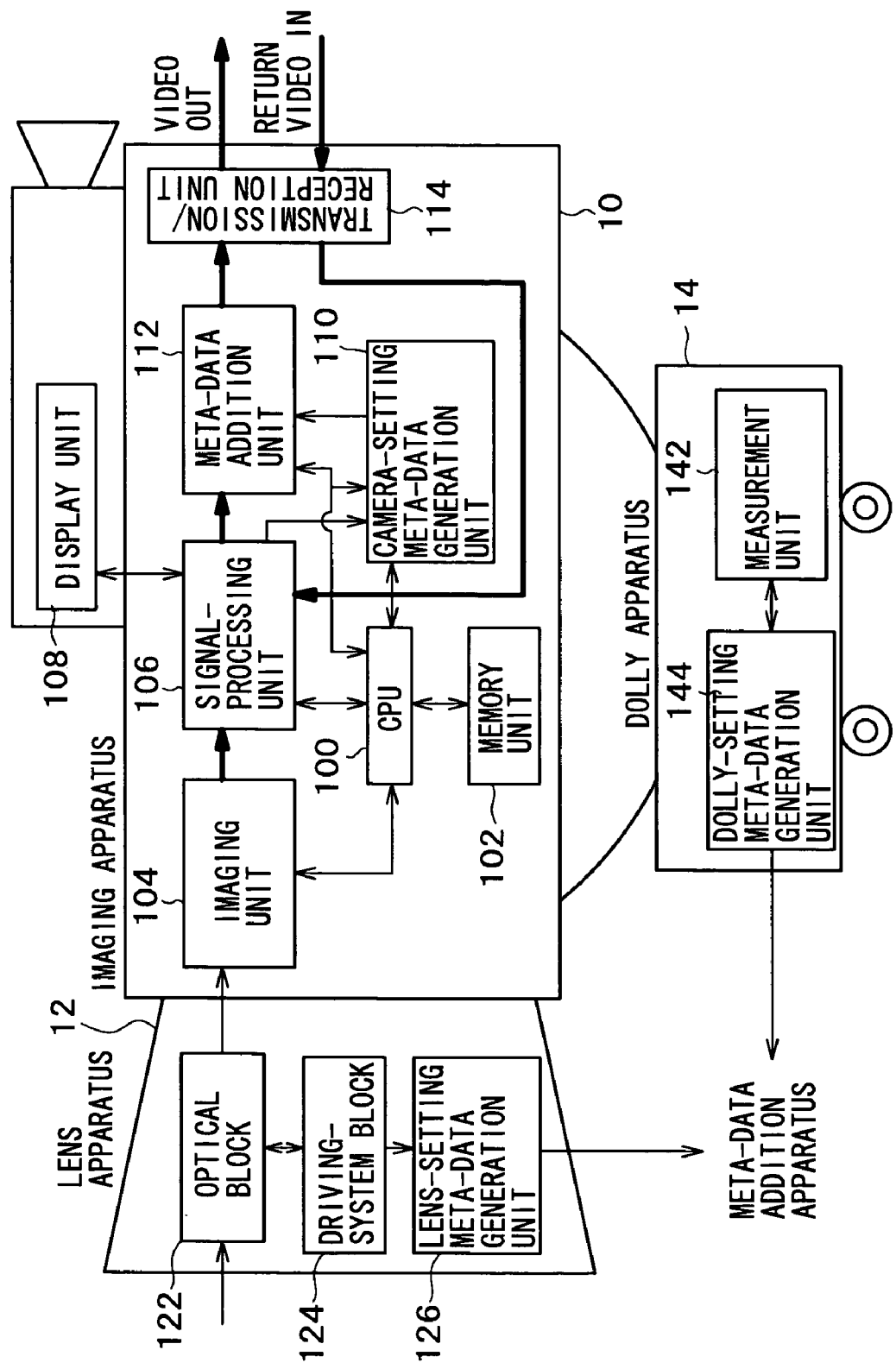
FIG. 7 is a block diagram showing the configuration of an imaging apparatus employed in the first embodiment.

First of all, the imaging apparatus 10 employed in this embodiment is described in detail by referring to FIG. 7. It is to be noted that FIG. 7 is a block diagram showing the configuration of the imaging apparatus 10 employed in this embodiment.

As shown in FIG. 7, the imaging apparatus 10 typically includes a CPU 100, a memory unit 102, an imaging unit 104, a signal-processing unit 106, a display unit 108, a camera-setting meta-data generation unit 110, a meta-data addition unit 112, a transmission/reception unit 114, the lens apparatus 12 and the dolly apparatus 14.

The CPU (Central Processing Unit) 100 functions as a processor as well as a controller and is thus capable of controlling operations carried out by the other components composing the imaging apparatus 10. The memory unit 102 can be any kind of storage unit such as a RAM, a ROM, a flash memory or a hard disk. The memory unit 102 is used for permanently or temporarily storing, among other information, various kinds of data related to processing carried out by the CPU 100 and operation programs executed by the CPU 100.

The imaging unit 104 typically has an OHB (Optical Head Base) configuration and is provided with a function to take an image of a shooting object and generate an image signal representing the taken image. To put it in detail, the imaging unit 104 generates an R, G and B spectrum of an optical image received from the lens apparatus 12 typically by using a prism, which is not shown in the figure. Then, the spectrum passes through a variety of filters also not shown in the figure before being converted into an analog electrical signal serving as a video signal in an opto-electrical conversion process carried out at a predetermined shutter speed by an imaging device such as a CCD (Charge Coupled Device), which is also not shown in the figure.

The signal-processing unit 106 is capable of converting the weak analog electrical signal received from the imaging unit 104 as a video signal into a digital video signal by carrying out a variety of processes including an automatic gain control (AGC) process, a correlation double sampling process, an A/D conversion process, an error correction process, a white-balance adjustment process, a dynamic range compression process, a gamma correction process, a shading correction process, a detail adjustment process and a knee process. It is to be noted that this embodiment has a configuration for generating and outputting typically an HD (High Definition) digital video signal. In addition, the signal-processing unit 106 is also capable of converting the digital video signal into an analog video signal by carrying out a digital-to-analog conversion process, and outputting the analog video signal to the display unit 108. Further, the signal-processing unit 106 is also capable of changing the frame rate of the output video signal to a value in the range 23.98 to 30 P typically on the basis of conditions set in advance or in accordance with an input operation carried out by the cameraman.

The display unit 108 is typically a view finder used by the cameraman to view a shooting object. The display unit 108 is a CRT monitor or the like. The display unit 108 is capable of outputting and displaying an analog video signal typically received from the signal-processing unit 106. It is to be noted that the display unit 108 can also be any other kind of display unit such as an LCD monitor or the like.

The camera-setting meta-data generation unit 110 acquires and manages parameters such as setting information of the imaging unit 104, setting information of signal processing including gamma, knee and detail processes carried out by the signal-processing unit 106. In addition, the camera-setting meta-data generation unit 110 generates the camera-setting meta data typically for each frame represented by a video signal on the basis of the parameters, and outputs the camera-setting meta data to the meta-data addition unit 112.

The meta-data addition unit 112 is capable of adding camera-setting meta data to a video signal of each frame typically in synchronization to a timing with which the video signal is output to a destination outside the imaging apparatus 10. To put it concretely, the meta-data addition unit 112 carries out a KLV encoding process on camera-setting meta data received typically from the camera-setting meta-data generation unit 110 to generate a package of the meta data. Then, the meta-data addition unit 112 inserts the packed camera-setting meta data into an area included in a video signal of each frame as an area allocated to the camera-setting meta data sequentially one frame after another as shown in FIG. 8A. The area allocated to the camera-setting meta data is a part of the blanking area of the video signal.

In the process of inserting the camera-setting meta data into such an area, the meta-data addition unit 112 is capable of inserting typically dummy data in groups other than the camera-setting group as shown in FIG. 8A. The groups other than the camera-setting group are the scene-information group, the lens-setting group and the dolly-setting group.

It is to be noted that the camera-setting meta-data generation unit 110 and the meta-data addition unit 112, which have processing functions described above, can each have a configuration implemented typically by hardware or software for implementing the functions. In the case of a configuration implemented by software, programs of the software are stored in the memory unit 102 to be executed by the CPU 100 to carry out actual processing.

The transmission/reception unit 114 typically transmits a video signal with camera-setting meta data added thereto as described above to the CCU 20 through an optical fiber cable. In addition, the transmission/reception unit 114 receives a meta-data-synthesized video signal from the meta-data synthesis apparatus 60 as the aforementioned return video signal. The transmission/reception unit 114 passes on the meta-data-synthesized video signal to the signal-processing unit 106. The signal-processing unit 106 typically converts the meta-data-synthesized video signal into an analog video signal by carrying out a digital-to-analog conversion process, and outputs the analog video signal to the display unit 108. As a result, the display unit 108 is capable of displaying an image with meta data superimposed thereon.

The lens apparatus 12 typically includes an optical block 122, a driving-system block 124 and a lens-setting meta-data generation unit 126.

The optical block 122 typically includes a plurality of lenses and a plurality of diaphragms. The optical block 122 is capable of supplying an optical image of a shooting object to the imaging unit 104. The driving-system block 124 is capable of controlling typically the zoom, the iris and the focus to mention a few by adjustment of parameters such as the distances between lenses and the diaphragms in the optical block 122.

The lens-setting meta-data generation unit 126 typically acquires and manages parameters such as lens-setting information of the driving-system block 124. In addition, the lens-setting meta-data generation unit 126 generates lens-setting meta data typically for each frame on the basis of the parameters. The lens-setting meta-data generation unit 126 outputs the lens-setting meta data generated in this way to the meta-data addition apparatus 40 typically through an RS-232C cable.

The dolly apparatus 14 typically includes a measurement unit 142 and a dolly-setting meta-data generation unit 144.

The measurement unit 142 measures various kinds of setting information related to the dolly apparatus 14 and outputs the information to the dolly-setting meta-data generation unit 144. The setting information typically includes GPS information, the movement speed and movement direction of the dolly apparatus 14 and the angles of the imaging apparatus 10.

The dolly-setting meta-data generation unit 144 generates the dolly-setting meta data described above typically for each frame, for example, on the basis of the measured information received from the measurement unit 142. The dolly-setting meta-data generation unit 144 outputs the dolly-setting meta data generated in this way to the meta-data addition apparatus 40 typically through an RS-232C cable.

4.2: Camera Control Unit

Next, the CCU 20 provided by this embodiment is explained in detail by referring to FIG. 9. It is to be noted that FIG. 9 is a block diagram showing the configuration of the CCU 20 employed in this embodiment.

As shown in FIG. 9, the CCU 20 typically includes a CPU 200, a memory unit 202, a transmission/reception unit 204, a signal-processing unit 206, a serializer 208 and a deserializer 210.

The CPU 200 functions as a processor as well as a controller and is thus capable of controlling operations carried out by the other components composing the CCU 20. The CPU 200 receives a reference signal, which allows synchronization with other apparatus employed in the meta-data display system 1 to be established. The memory unit 202 can be any kind of storage unit such as a RAM, a ROM, a flash memory or a hard disk. The memory unit 202 is used for permanently or temporarily storing, among other information, various kinds of data related to processing carried out by the CPU 200 and operation programs executed by the CPU 200.

The transmission/reception unit 204 typically receives a video signal with camera-setting meta data added thereto from the imaging apparatus 10 and passes on the received video signal to the signal-processing unit 206.

The signal-processing unit 206 typically carries out a process to convert a video signal received as an optical signal into an HD SDI signal and outputs the HD SDI signal to the serializer 208. It is to be noted that the signal-processing unit 206 can also have a configuration including the processing functions of the signal-processing unit 106 employed in the imaging apparatus 10.

The serializer 208 converts a parallel video signal received typically from the signal-processing unit 206 into a serial video signal by carrying out a parallel-to-serial conversion process, and transmits the serial video signal to the meta-data addition apparatus 40 through an HD SDI cable. It is to be noted that, as shown in FIG. 8A, actual camera-setting meta data has been inserted into typically only an area included in the blanking area of the video signal output by the CCU 20 as an area allocated to the camera-setting meta data. On the other hand, dummy data has been inserted into areas other than the area allocated to the camera-setting meta data. These other areas in the blanking area are allocated to the other meta-data groups.

The deserializer 210 converts a serial return video signal received typically from the meta-data synthesis apparatus 60 into a parallel signal by carrying out a serial-to-parallel conversion process, and transmits the parallel return video signal to the signal-processing unit 206.

The signal-processing unit 206 converts the parallel return video signal typically received as an HD SDI signal into an optical signal and outputs the optical signal to the transmission/reception unit 204. The transmission/reception unit 204 passes on this return video signal to the imaging apparatus 10 typically through an optical fiber cable.

4.3: Meta-Data Addition Apparatus

Figure 10:
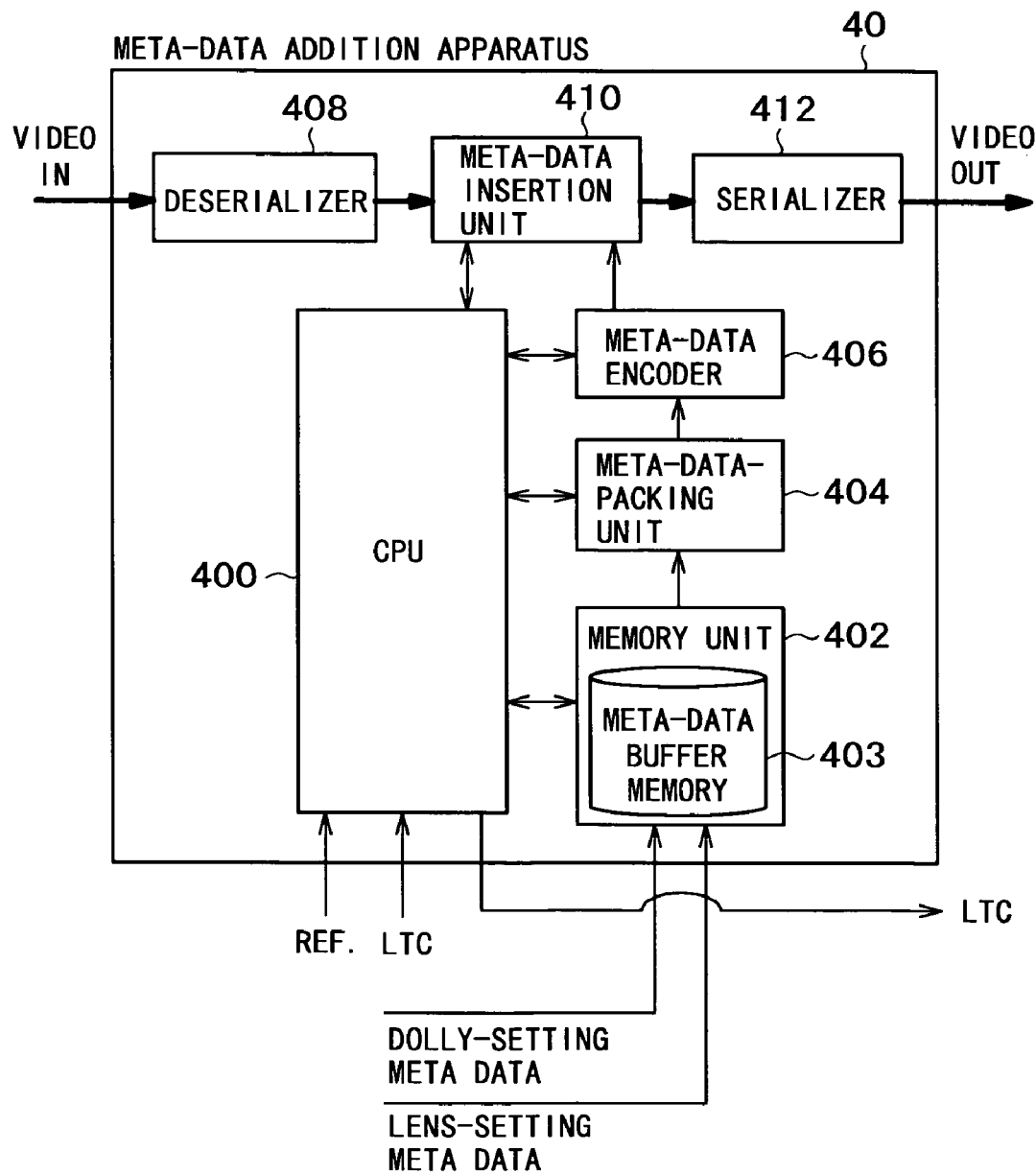
FIG. 10 is a block diagram showing the configuration of a meta-data addition apparatus employed in the first embodiment.

Next, the meta-data addition apparatus 40 provided by this embodiment is explained in detail by referring to FIG. 10. It is to be noted that FIG. 10 is a block diagram-showing the configuration of the meta-data addition apparatus 40 employed in this embodiment.

As shown in FIG. 10, the meta-data addition apparatus 40 typically includes a CPU 400, a memory unit 402, a meta-data-packing unit 404, a meta-data encoder 406, a deserializer 408, a meta-data insertion unit 410 and a serializer 412.

The CPU 400 functions as a processor as well as a controller and is thus capable of controlling operations carried out by the other components composing the meta-data addition apparatus 40. The CPU 400 receives a reference signal, which allows synchronization with other apparatus employed in the meta-data display system 1 to be established. In addition, the CPU 400 also receives a time-code signal (LTC) and is capable of generating time-code information as one kind of scene-information meta data on the basis of the time-code signal LTC and storing the time-code information in the memory unit 402. Further, the CPU 400 is also capable of passing on the time-code signal LTC to the VTR 50.

The memory unit 402 can be any kind of storage unit such as a RAM, a ROM, a flash memory or a hard disk. The memory unit 402 is used for permanently or temporarily storing, among other information, various kinds of data related to processing carried out by the CPU 400 and operation programs executed by the CPU 400. In addition, the memory unit 402 has a meta-data buffer memory 403 for temporarily storing meta data transmitted typically from other apparatus.

To be more specific, the meta data stored in the meta-data buffer memory 403 typically includes lens-setting meta data sequentially received from the lens apparatus 12 after the start of a shooting operation, dolly-setting meta data sequentially received from the dolly apparatus 14 after the start of a shooting operation, scene-information meta data received in advance from the meta-data input terminal 30 prior to the start of a shooting operation and time-code information received from the CPU 400.

The meta-data-packing unit 404 typically selects required meta data among various kinds of meta data stored in the meta-data buffer memory 403, extracts the selected meta data, packs the extracted meta data in a plurality of different meta-data groups intended for different purposes of utilizing the meta data and puts the meta-data groups in a KLV structure described earlier. The meta-data groups are the lens-setting group, the dolly-setting group and the scene-information group. The meta-data-packing unit 404 then outputs the meta-data groups packed into a KLV structure to the meta-data encoder 406.

The meta-data encoder 406 encodes meta data received from the meta-data-packing unit 404. Meta data supplied to the meta-data addition apparatus 40 as described above is typically data of an RS-232C protocol format. For this reason, the meta-data encoder 406 encodes the meta data by changing the format of the meta data to typically an ancillary data packet format so that the meta data can be inserted into a video signal having an HD SDI format (refer to FIGS. 6A and 6B). As a result of this encoding process, for example, a variety of flags is added to the head of the meta data whereas codes such as the CRC are added to the tail of the meta data as described earlier.

The deserializer 408 converts a serial video signal received from the CCU 20 into a parallel video signal by carrying out a serial-to-parallel conversion process, and outputs the parallel video signal to the meta-data insertion unit 410.

The meta-data insertion unit 410 sequentially inserts the meta data received from the meta-data encoder 406 into the blanking area of the video signal of each frame received from the deserializer 408.

When the meta-data insertion unit 410 inserts the meta data, camera-setting meta data included in a camera-setting group has been typically inserted in advance by the imaging apparatus 10 into an area included in the blanking area of the video signal received by the meta-data insertion unit 410 as an area allocated to the camera-setting group as shown in FIG. 8A.

On the other hand, dummy data has been inserted into areas other than the area allocated to the camera-setting meta data. These other areas in the blanking area are allocated to the other meta-data groups, i.e., the scene-information group, the lens-setting group and the dolly-setting group. Thus, the meta-data insertion unit 410 replaces the dummy data already stored in the area allocated to the scene-information group with for example the actual scene-information meta data, the dummy data already stored in the area allocated to the lens-setting group with for example the actual lens-setting meta data and the dummy data already stored in the area allocated to the dolly-setting group with for example the actual dolly-setting meta data as shown in FIG. 8B in order to insert the meta data into the video signal. In the process to replace the dummy data with the meta data as described above, the meta-data insertion unit 410 detects each of the areas allocated to the scene-information group, the lens-setting group and the dolly-setting group typically on the basis of the group identification information K and the data amount information L, which have been appended to each of the scene-information group, the lens-setting group and the dolly-setting group, and inserts the correct meta data into each of the detected areas. In this way, the group identification information K and the data amount information L allow the process to replace the dummy data with the meta data to be carried out with a high degree of efficiency. In addition, the meta-data insertion unit 410 is typically capable of adjusting the phase of the delay time between the inserted meta data and the video signal in the process to replace the dummy data with the meta data as described above.

The serializer 412 converts the parallel video signal including additional meta data inserted by the meta-data insertion unit 410 into each frame thereof as described above into a serial video signal by carrying out a parallel-to-serial conversion process, and transmits the serial video signal to the VTR 50.

As described above, the meta-data addition apparatus 40 provided by this embodiment is typically capable of additionally appending scene-information meta data, lens-setting meta data and dolly-setting meta data to a video signal already including camera-setting meta data added thereto from the beginning.

4.4: Video Tape Recorder

Figure 11:
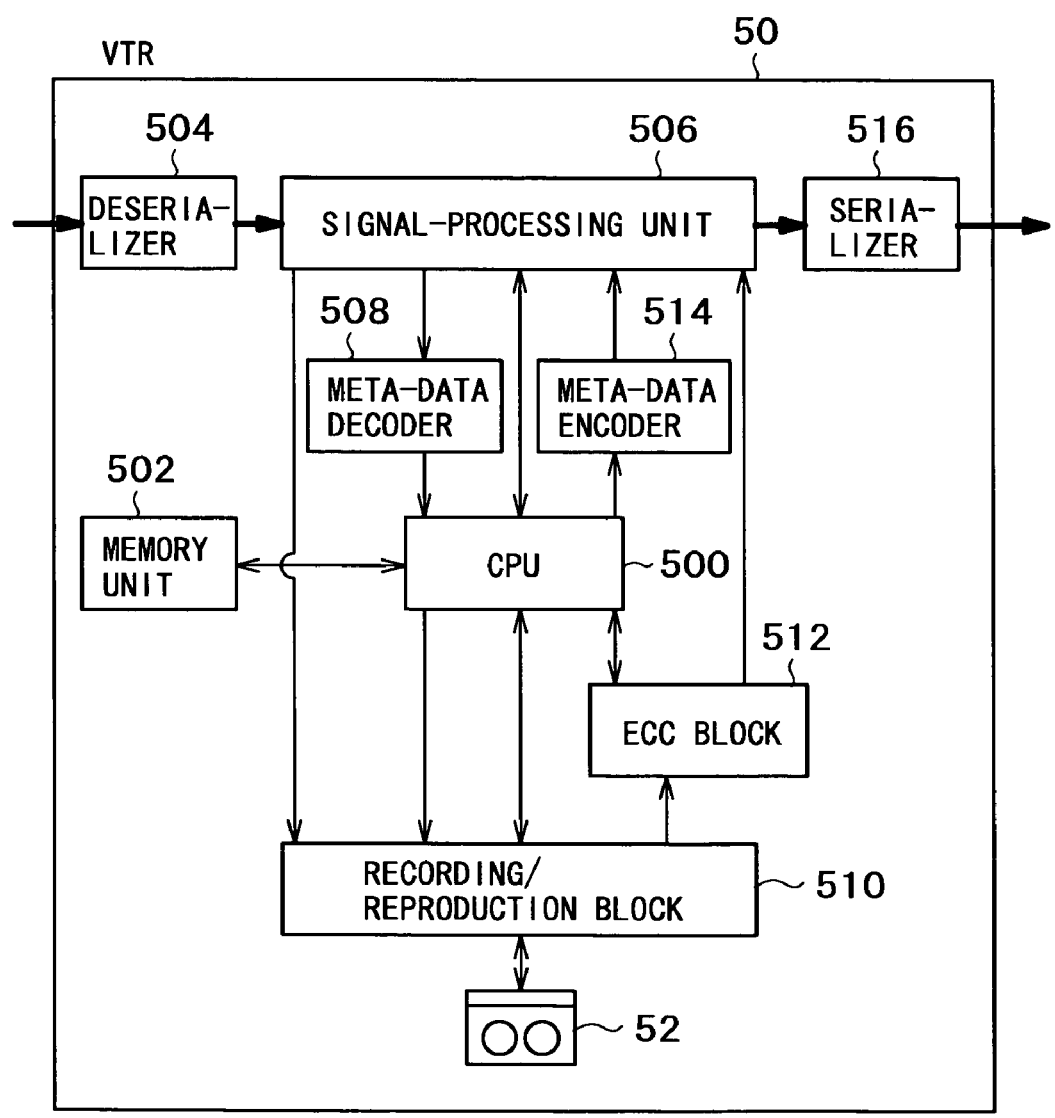
FIG. 11 is a block diagram showing the configuration of a video tape recorder employed in the first embodiment.

Next, the VTR 50 provided by this embodiment is explained in detail by referring to FIG. 11. It is to be noted that FIG. 11 is a block diagram showing the configuration of the VTR 50 employed in this embodiment.

As shown in FIG. 11, the VTR 50 typically includes a CPU 500, a memory unit 502, a deserializer 504, a signal-processing unit 506, a meta-data decoder 508, a recording/reproduction block 510, a ECC block 512, a meta-data decoder 514 and a serializer 516.

The CPU 500 functions as a processor as well as a controller and is thus capable of controlling operations carried out by the other components composing the VTR 50. The CPU 500 receives a time code (LTC) signal. The memory unit 502 can be any kind of storage unit such as a RAM, a ROM, a flash memory or a hard disk. The memory unit 502 is used for permanently or temporarily storing, among other information, various kinds of data related to processing carried out by the CPU 500 and operation programs executed by the CPU 500.

The deserializer 504 converts a serial video signal received from the meta-data addition apparatus 40 into a parallel video signal by carrying out a serial-to-parallel conversion process, and outputs the parallel video signal to the signal-processing unit 506.

The signal-processing unit 506 is capable of carrying out a variety of processes on a video signal typically in order to well reproduce the video signal from the video tape 52 and record the signal onto the video tape 52. For example, if necessary, the signal-processing unit 506 is capable of carrying out processes to compress and decompress a video signal by adoption an MPEG1 (Moving Picture Experts Group phase 1) method, an MPEG2 method, an MPEG4 method or a DCT (Discrete Cosine Transform) method. In addition, the signal-processing unit 506 is also capable of typically adjusting the recording/reproduction timing of the video signal and separating video and audio signals from each other before adding an ECC (Error-Correcting Code). On the top of that, the signal-processing unit 506 is typically capable of extracting meta data added to a video signal of each frame and, reversely, inserting decoded meta data into a video signal of each frame.

The signal-processing unit 506 is also typically capable of outputting a video signal received from the meta-data addition apparatus 40 to the meta-data decoder 514 as it is or a video signal reproduced from the video tape 52 to the meta-data decoder 514.

The meta-data decoder 508 typically decodes meta data extracted from a video signal. To put it concretely, the meta-data decoder 508 eliminates typically flags such as the Flag, DID and SDID flags and codes such as a CRC from meta data and outputs the meta data to the CPU 500. This is because the eliminated flags are not required in a recording operation. The CPU 500 typically adds an ECC to the meta data much like a video signal and outputs the meta data to the recording/reproduction block 510.

The recording/reproduction block 510 typically includes a video head and a driving mechanism, which are not shown in the figure. The recording/reproduction block 510 is capable of actually recording and reproducing a video signal including additional meta data onto and from the video tape 52. To put it in detail, the recording/reproduction block 510 is capable of typically setting a video signal, an audio signal and meta data in a frame and recording the frames into a recording area of the video tape 52 sequentially one frame after another. The recording/reproduction block 510 is also capable of typically treating a video signal, an audio signal and meta data, which are already recorded in a recording area of the video tape 52, as a frame and reproducing the frames from the recording area sequentially one frame after another.

The ECC block 512 typically detects errors of a video signal or the like, which is reproduced by the recording/reproduction block 510 from the video tape 52, on the basis of an ECC added to the signal. After errors are detected, the ECC block 512 typically outputs the reproduced meta data to the meta-data decoder 514 by way of the CPU 500 and the reproduced video and audio signals to the signal-processing unit 506.

The meta-data decoder 514 encodes the reproduced meta data into data with a format for transmission by adding the flags described above and codes such as a CRC to the meta data, and outputs the encoded data to the signal-processing unit 506. The signal-processing unit 506 typically combines the video and audio signals received from the ECC block 512 with the meta data encoded by the meta-data decoder 514, outputting a combined signal to the serializer 516.

The serializer 516 converts the parallel video and audio signals and the meta data, which are received from the signal-processing unit 506, into a serial signal by carrying out a parallel-to-serial conversion process, and transmits the serial signal to the meta-data synthesis apparatus 60.

It is to be noted that, as described above, components including the signal-processing unit 506, the meta-data decoder 508, the CPU 500, the recording/reproduction block 510, the ECC block 512 and the meta-data encoder 514 compose the recording/reproduction unit of this embodiment. This recording/reproduction unit is capable of-recording and reproducing a video signal including additional meta data onto and from a recording medium.

4.5: Meta-Data Synthesis Apparatus

Next, the meta-data synthesis apparatus 60 provided by this embodiment is explained in detail by referring to FIG. 12. It is to be noted that FIG. 12 is a block diagram showing the configuration of the meta-data synthesis apparatus 60 employed in this embodiment.

As shown in FIG. 12, the meta-data synthesis apparatus 60 typically comprises a CPU 600, a memory unit 602, a deserializer 604, a meta-data extraction unit 606, a meta-data decoder 608, a meta-data video generation unit 610, a meta-data video synthesis unit 612 and a serializer 614.

The CPU 600 functions as a processor as well as a controller and is thus capable of controlling operations carried out by the other components composing the meta-data synthesis apparatus 60. The memory unit 602 can be any kind of storage unit such as a RAM, a ROM, a flash memory or a hard disk. The memory unit 602 is used for permanently or temporarily storing, among other information, various kinds of data related to processing carried out by the CPU 600 and operation programs executed by the CPU 600.

The deserializer 604 converts a serial video signal received from the VTR 50 into a parallel video signal by carrying out a serial-to-parallel conversion process, and outputs the parallel video signal to the meta-data extraction unit 606.

The meta-data extraction unit 606 extracts meta data typically already inserted into the blanking area of a video signal of each frame. At that time, the meta-data extraction unit 606 does not extract all the meta data already inserted into the blanking area, but can typically extract only data included a particular meta-data group such as a scene-information group or only specific information of the data included in the particular meta-data group. Examples of the specific information are a time code, a scene number and a take number. In the case of the meta-data synthesis apparatus 60 provided by this embodiment, by setting which meta data is to be extracted in advance, for example, the meta-data extraction unit 606 is capable of extracting only any necessary meta data from various kinds of meta data.

It is to be noted that, in the process to extract meta data, the meta-data extraction unit 606 detects each of the areas allocated to the meta-data groups typically on the basis of the group identification information K and the data amount information L, which have been appended to each of the meta-data groups, and then extracts the meta data from the correct detected area. In this way, the group identification information K and the data amount information L allow the process to extract required meta data to be carried out with a high degree of efficiency.

While the meta-data extraction unit 606 outputs the meta data extracted as described above to typically the meta-data decoder 608, the meta-data extraction unit 606 outputs a video signal to the meta-data video synthesis unit 612 as it is.

The meta-data decoder 608 typically decodes meta data received from the meta-data extraction unit 606 and outputs the decoded meta data to the meta-data video generation unit 610.

The meta-data video generation unit 610 is capable of typically changing the meta data received from the meta-data decoder 608 to video data for superimposition. That is to say, since the meta data decoded by the meta-data decoder 608 is meta data having typically a text-data format, the meta-data video generation unit 610 converts this meta data into data having a video-data format.

The meta-data video synthesis unit 612 is typically capable of synthesizing video data obtained as a result of a conversion process carried out by the meta-data video generation unit 610 with a video signal received from the meta-data extraction unit 606 for each frame sequentially from one frame to another. In other words, the meta-data video synthesis unit 612 is capable of typically multiplexing the video data resulting from conversion of meta data in the video signal of each frame by superimposing the video data on the frame. In this way, the meta-data video synthesis unit 612 extracts meta data from a video signal as an image and synthesizes the image with the video signal to generate a meta data-synthesized video signal.

The serializer 614 typically converts a parallel meta data-synthesized video signal received from the meta-data video synthesis unit 612 into a serial signal by carrying out a parallel-to-serial conversion process. Then, the serializer 614 transmits the serial meta data-synthesized video signal to the display apparatus 70. In addition, the serializer 614 also transmits the serial meta data-synthesized video signal as a return video signal typically to the imaging apparatus 10 by way of the CCU 20.

As described above, the meta-data synthesis apparatus 60 is capable of fetching meta data inserted typically into the blanking area of a video signal, which is being generated from a shooting operation carried out by the imaging apparatus 10, or a video signal reproduced by the VTR 50 and synthesizing the meta data as video data with the video signal by superimposition or the like. Thus, the meta-data synthesis apparatus 60 is capable of generating a meta data-synthesized video signal by superimposition of meta data on the video signal. The meta-data synthesis apparatus 60 is capable of further transmitting the meta data-synthesized video signal to for example the display apparatus 70.

As a result, the display apparatus 70 is capable of displaying an image with meta data superimposed thereon on the basis of the meta data-synthesized video signal received from the meta-data synthesis apparatus 60. Thus, a person such as the director is capable of inspecting for example an image being recorded by the imaging apparatus 10 or an image reproduced by the VTR 50 after being recorded in addition to the meta data related to the video.

In addition, the meta-data synthesis apparatus 60 is also capable of transmitting the meta data-synthesized video signal to the imaging apparatus 10 as a return video signal. As a result, the imaging apparatus 10 is capable of receiving the meta data-synthesized video signal as a return video signal for a video signal being presently shot by the imaging apparatus 10 or for a video signal shot in the past. On the basis of this meta data-synthesized video signal, an image with meta data superimposed thereon can be displayed on the display unit 108, which functions typically as a view finder. Thus, a person such as the cameraman is capable of inspecting for example an image being recorded by the imaging apparatus 10 or an image reproduced by the VTR 50 after being recorded in addition to the meta data related to the image.

5: Video-Recording Method

Next, a video-recording method provided by this embodiment implementing the meta-data display system 1 is explained by referring to FIG. 13. It is to be noted that FIG. 13 shows timing charts used for explaining the video-recording method provided by this embodiment.

As shown in FIG. 13A, when a shooting operation is started, first of all, live images are supplied sequentially to the imaging apparatus 10. Then, the imaging apparatus 10 generates a video signal in consecutive frame units such as frame 0, frame 1, frame 2 and so on. At that time, typically, a CCD of the imaging apparatus 10 scans taken images typically by adopting the progressive method. For this reason, the video signal output by the imaging apparatus 10 lags behind live images input to the imaging apparatus 10 by typically one frame. As a result, the output of the CCU 20 also lags behind the live images by typically one frame as shown in FIG. 13B.

In addition, at about the same time as the generation of the video signal, the imaging apparatus 10 also generates camera-setting meta data for each frame and inserts the camera-setting meta data into the blanking area of the video signal of each frame as shown in FIG. 13B. In this way, while being used for carrying out a shooting operation to generate a video signal, the imaging apparatus 10 is capable of adding meta data of a camera-setting group for the video signal to the video signal of each frame.

In addition, concurrently with a shooting operation carried out by using such an imaging apparatus 10, the lens apparatus 12 and the dolly apparatus 14 collect setting information for the shooting operation for generating lens-setting meta data and dolly-setting meta data for typically each frame, and outputs the pieces of lens-setting meta data and dolly-setting meta data sequentially to the meta-data addition apparatus 40.

In addition, the CCU 20 sequentially receives the video signal generated by the imaging apparatus 10 with camera-setting meta data added thereto for each frame. The CCU 20 passes on sequentially the video signals to the meta-data addition apparatus 40 as shown in FIG. 13B.

Then, receiving the video signal from the CCU 20, the meta-data addition apparatus 40 inserts typically scene-information meta data, lens-setting meta data and dolly-setting meta data sequentially to the blanking area of the video data of each frame as shown in FIG. 13C. In addition, the meta-data addition apparatus 40 adds time-code information to the video signal of each frame as a piece of scene-information meta data. In this way, the meta-data addition apparatus 40 is capable of adding grouped meta data in accordance with the purpose of utilizing the meta data to the video signal of each frame concurrently with the shooting operation carried out by using the imaging apparatus 10.

Then, the VTR 50 sequentially receives a video signal including additional meta data typically from the meta-data addition apparatus 40 as shown in FIG. 13D and an audio signal from the sound collection apparatus 18. The audio data is once stored typically in the memory unit 502 to establish synchronization with the video signal, which lags behind the live images. After decoding the meta data included in the video signal, the VTR 50 records the meta data along with the video signal and the synchronized audio signal onto the video tape 52 in frame units.

As described above, in accordance with the video-recording method provided by this embodiment, for example, while a shooting operation is being carried out by using the imaging apparatus 10, various kinds of meta data can be generated, grouped and added to a video signal generated by the shooting operation for each frame represented by the video signal before being recorded onto a recording medium.

6: Meta-Data Display Method

Figure 14:
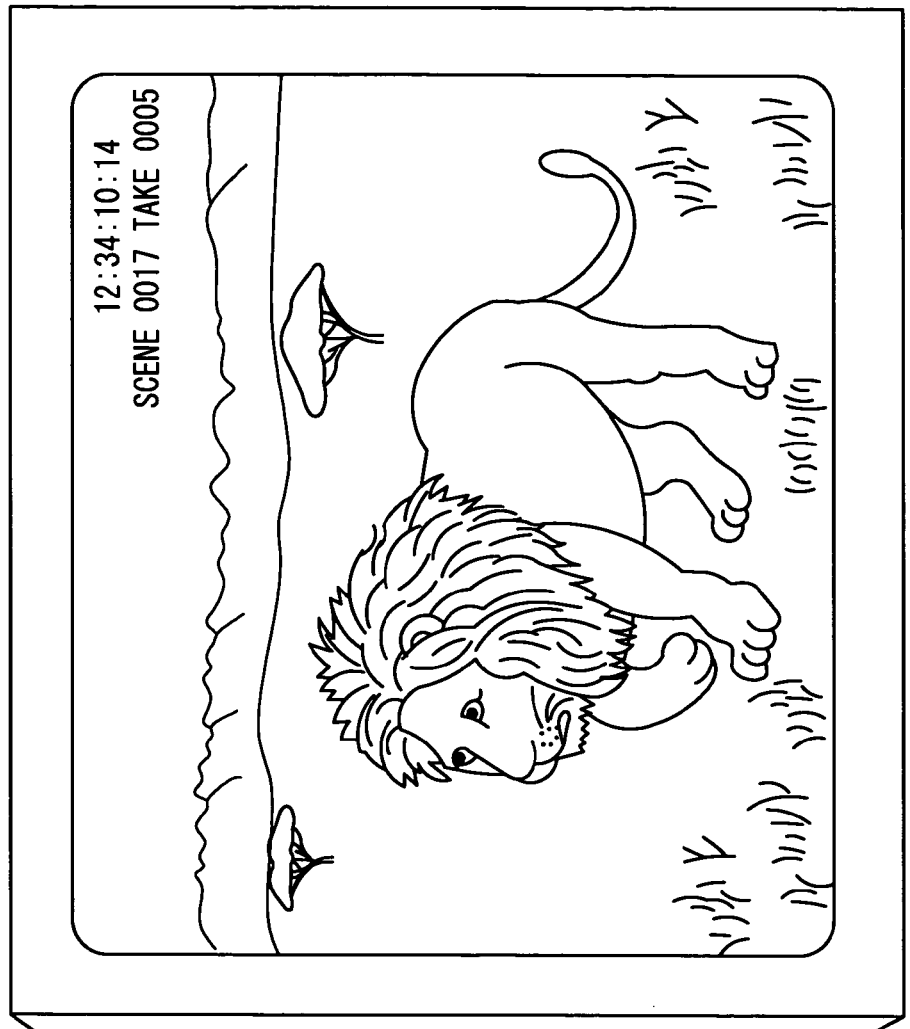
FIG. 14 is an explanatory diagram showing a typical return image, which is displayed on a display unit of the imaging apparatus employed in the first embodiment while being shot and recorded.
Figure 15:
FIG. 15 is an explanatory diagram showing a typical return image, which is displayed on the display unit of the imaging apparatus employed in the first embodiment after being shot and recorded.

Next, a meta-data display method provided by this embodiment implementing the meta-data display system 1 is explained by referring to FIGS. 14 and 15. It is to be noted that FIGS. 14 and 15 are each an explanatory diagram showing a typical return image appearing on the display unit 108 employed in the imaging apparatus 10 provided by this embodiment.

6.1: Meta-Data Display Method During Shooting and Recording

First of all, the following description explains a process to display a video signal being shot and recorded onto a recording medium to the display unit 108 employed in the imaging apparatus 10 in a shooting operation carried out by using the imaging apparatus 10 and a recording operation carried out by the VTR 50.

As described earlier by referring to FIG. 13, in a shooting operation carried out by using the imaging apparatus 10, the meta-data addition apparatus 40 adds meta data to a video signal generated by the imaging apparatus 10 for each frame represented by the video signal. The video signal having the meta data added thereto in this way is typically supplied to the meta-data synthesis apparatus 60 by way of the VTR 50 in real time. Receiving the video signal, the meta-data synthesis apparatus 60 sequentially extracts pieces of predetermined meta data from frames represented by the video signal typically on the basis of set extraction conditions, and decodes the extracted meta data. Then, the meta-data synthesis apparatus 60 converts the decoded meta data into video data, and sequentially synthesizes the video data with the video signal of each frame to generate and output the aforementioned meta-data-synthesized video signal. The meta-data-synthesized video signal is supplied to the imaging apparatus 10 typically as a return video signal.

In this way, when the cameraman is carrying out a shooting operation by using the imaging apparatus 10, typically, the meta-data synthesis apparatus 60 supplies the return video signal to the imaging apparatus 10. As a result, an image being shot by the cameraman can be typically displayed on the display unit 108 employed in the imaging apparatus 10 as shown in FIG. 14. In the example shown in FIG. 14, the shooting object is a lion. In addition to the image being shot, for example, data such as scene-information meta data extracted by the meta-data synthesis apparatus 60 can also be displayed by superimposition of the data on the image. To put it concretely, in the case of the screen shown in FIG. 14 for example, on the right upper corner of the display screen, a time code of '12:34:10:14', a scene number of '0017' for a video material being shot and a take number of '0005' for the video material being shot are displayed by superimposition of the data on the image of the video material. The time code, the scene number and the take number are each information, which used to be traditionally displayed for example on the conventional electronic slate apparatus. The time code, the scene number and the take number are each meta data extracted from a variety of pieces of meta data under extraction conditions set by the meta-data synthesis apparatus 60.

By displaying such a returned image, the cameraman is capable of inspecting not only the image being shot, but also scene-information meta data, which used to be displayed on an electronic slate apparatus. Thus, a person such as a cameraman is capable of easily identifying and confirming the scene, take and time of an image being shot on the basis of the scene-information meta data superimposed on the image.

6.2: Meta-Data Display Method after Shooting and Recording

Next, the following description explains a process to display a video signal recorded on a recording medium such as the video tape 52 and reproduced by the VTR 50 on the display unit 108 employed in the imaging apparatus 10 after an operation to shoot and record a scene is completed.

As described above, a video signal that is generated by the imaging apparatus 10 and includes meta data added by the meta-data synthesis apparatus 60 and the like for each frame is recorded onto a recording medium such as the video tape 52 by the VTR 50. In order to display such a recorded video material after an operation to shoot and record the video material, first of all, the VTR 50 reproduces the video signal of the video material from the recording medium such as the video tape 52. The video signal reproduced by the VTR 50 is then supplied to, for example, the meta-data synthesis apparatus 60 sequentially in frame units. Receiving the video signal, the meta-data synthesis apparatus 60 generates a meta-data-synthesized video signal in the same way as the one described above, and outputs the meta-data-synthesized video signal to typically the imaging apparatus 10 as a return video signal.

As described above, a video signal reproduced by the VTR 50 after completion of an operation to shoot and record a scene is typically supplied from the meta-data synthesis apparatus 60 to the imaging apparatus 10 as a return video signal. As a result, for example, meta data extracted by the meta-data synthesis apparatus 60 is displayed typically along with a reproduced image by superimposition of the meta data on the image as shown in FIG. 15. To put it concretely, in the case of the screen shown in FIG. 15 for example, on the left upper corner of the display screen, the same scene-information meta data as that appearing on the screen shown in FIG. 14 is displayed by superimposition of the scene-information meta data on the image of the video material. On the right upper corner of the display screen, on the other hand, other meta data of the shooting operation of the video material is displayed by superimposition of the other meta data on the image of the video material. The other meta data includes a shutter-speed setting of $\frac{1}{125}$ for the imaging apparatus 10, a zoom setting of 10 times for the lens apparatus 12 and a movement speed of 1.2 m/s for the dolly apparatus 14. As described above, in addition to a return image, the display screen is capable of showing not only scene-information meta data, but also necessary meta-data items selected among the camera-setting meta data, the lens-setting meta data and the dolly-setting meta data. The meta-data items can be selected by setting extraction conditions of the meta-data synthesis apparatus 60.

By displaying such a return image, a person such as the cameraman is capable of inspecting the reproduced image displayed on the display unit 108 after a shooting and recording operation and, hence, checking good and bad points of the image shot by itself by taking the meta data as a reference.

At that time, the scene-information meta data is displayed by superimposition of the scene-information meta data on the return image as shown in FIG. 15. By superimposition of the scene-information meta data on the return image in this way, the cameraman is capable of easily identifying and easily confirming the scene, take and time of an image shot on the basis of the scene-information meta data superimposed on the image. In addition, desired meta-data items are also displayed by superimposition of the meta-data items on the return image as meta-data items selected among meta data such as the camera-setting meta data, the lens-setting meta data and the dolly-setting meta data. Thus, the cameraman is capable of grasping other data by intuition with a high degree of accuracy. The other data includes the picture quality of the image, the movement of the shooting object, the shooting condition and the setting of apparatus such as the imaging apparatus 10. Therefore, in another operation to again shoot the same scene, the cameraman is capable of properly resetting apparatus such as the imaging apparatus 10 and correctly adjusting the shooting angle and the shooting zoom by taking the meta data superimposed on the return image as a reference.

Second Embodiment

Next, a meta-data display system 1 implemented by a second embodiment of the present invention is explained. The meta-data display system 1 implemented by the second embodiment is different from the meta-data display system 1 implemented by the first embodiment only in that the imaging apparatus 10 does not add camera-setting meta data to a video signal and the meta-data addition apparatus 40 thus gathers up all meta data, adding all the meta data to a video signal. Since other functional configurations of the second embodiment are the same as their counterparts in the first embodiment, their explanation is not repeated.

Figure 16:
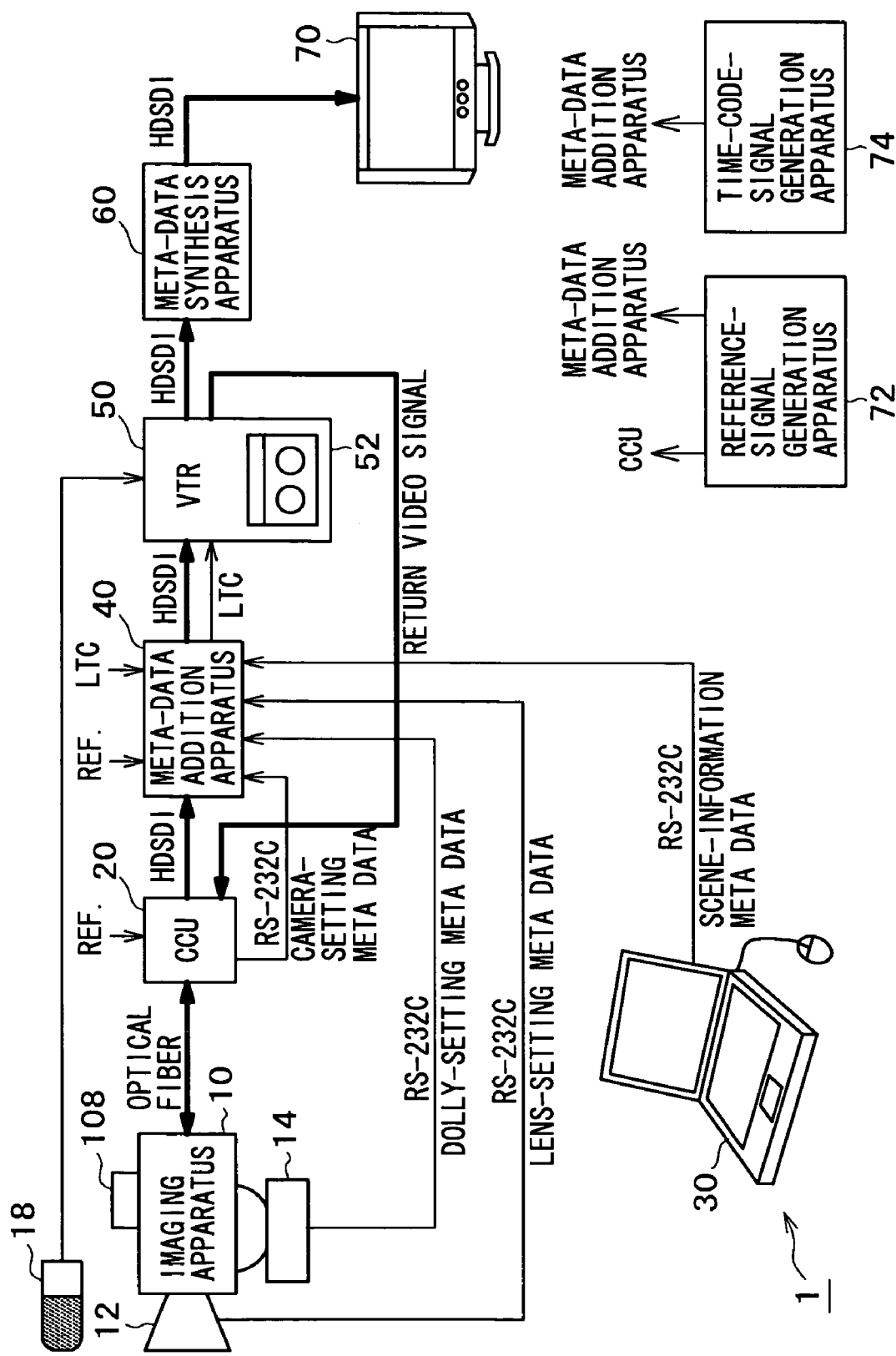
FIG. 16 is a block diagram showing a rough configuration of a meta-data display system implemented by a second embodiment.

By referring to FIG. 16, the following description explains the overall configuration of the meta-data display system 1 implemented by this embodiment and unique processing functions of apparatus employed in the embodiment. It is to be noted that FIG. 16 is a block diagram showing a rough configuration of the meta-data display system 1 implemented by the embodiment.

As shown in FIG. 16, the meta-data display system 1 implemented by the embodiment has a configuration in which, for example, the CCU 20 is capable of supplying camera-setting meta data received from the imaging apparatus 10 to the meta-data addition apparatus 40 by way of typically an RS-232C cable provided separately from the path for the video signal. This configuration is effective for an imaging apparatus 10 incapable of adding camera-setting meta data to the video signal of each frame unlike the imaging apparatus 10 employed in the first embodiment.

To put it in detail, the imaging apparatus 10 employed in the first embodiment is provided with the meta-data addition unit 112 as shown in FIG. 7. On the other hand, the imaging apparatus 10 employed in the second embodiment is typically provided with no meta-data addition unit 112. Thus, the imaging apparatus 10 employed in the second embodiment does not add camera-setting meta data to each frame represented by the video signal generated typically by the signal-processing unit 106. Instead, the imaging apparatus 10 merely outputs the video signal as it is from the transmission/reception unit 114 to the CCU 20. However, the imaging apparatus 10 and the CCU 20 exchange information such as camera-setting meta data of the imaging apparatus 10 through an optical cable or the like. Thus, the CCU 20 is capable of acquiring the camera-setting meta data of the imaging apparatus 10 when required. Accordingly, the CPU 200 or another component included in the CCU 20 is capable of sequentially supplying for example the camera-setting meta data to the meta-data addition apparatus 40 by way of typically an RS-232C cable provided separately from the path for the video signal. The camera-setting meta data received from the CCU 20 in this way is stored in the meta-data buffer memory 403 employed in the meta-data addition apparatus 40 along with meta data of the other meta-data groups.

Much like the first embodiment described above, the meta-data addition apparatus 40 typically puts the camera-setting meta data received from the CCU 20 in a group separated from the groups of the scene-information meta data, the lens-setting meta data and the dolly-setting meta data. Furthermore, the meta-data addition apparatus 40 typically packs these four meta-data groups in a package by carrying out a KLV encoding process and sequentially inserts the package into the blanking area of a video signal received from the CCU 20 as a video signal of every frame. By inserting the package in this way, for example, the meta-data addition apparatus 40 is thus capable of adding all meta data to the video signal of every frame. Since processing carried out afterward by other apparatus such as the VTR 50 is about the same as that of the first embodiment, its explanation is not repeated.

As described above, in the meta-data display system 1 implemented by the second embodiment, the meta-data addition apparatus 40 is capable of collecting as well as gathering up typically the scene-information meta data, the lens-setting meta data, the dolly-setting meta data and the camera-setting meta data, which are generated in the meta-data display system 1, and adding all the meta data to a video signal. Thus, even if an imaging apparatus 10 having no function to add meta data to a video signal is employed, the meta-data display system 1 implemented by the second embodiment is capable of adding all the meta data to a video signal of every frame.

In addition, even if meta data is added to a video signal as described above, much like the meta-data synthesis apparatus 60 employed in the first embodiment, the meta-data synthesis apparatus 60 employed in the second embodiment is capable of generating a meta-data-synthesized video signal and supplying the meta-data-synthesized video signal to the imaging apparatus 10 as a return video signal.

As described above, in accordance with the meta-data display systems 1 implemented by the first and second embodiments as well as the video-recording method and the data-display method, which use the meta-data display systems 1, meta data related to a video signal being generated by the imaging apparatus 10 in a shooting operation can be added to the video signal of every frame in a real-time manner and can thus be recorded on the same recording medium as the video signal. Accordingly, unlike the conventional system, it is no longer necessary to use information such as a time code as a means for linking meta data recorded in a terminal such as a PC to a video material recorded on a recording medium. That is to say, a video material and meta data related to the video material can be directly linked with each other and recorded on the same recording medium. Thus, a video material and meta data related to the video material can be managed in an integrated manner, resulting in convenience. In addition, in an operation to extract meta data related to a video material, it is not necessary to specially establish matching between the meta data and the video material so that only necessary meta data can be extracted, used and renewed with a high degree of efficiency.

At a stage of editing a video material, for example, the video material is edited to cut out its portion between In and Out points. Even in this case, meta data for the portion of the video material is also cut out along with the portion. Thus, meta data related to a video material can be extracted and displayed continuously in synchronization with the video material without the need to specially establish matching between the meta data and the video material. In addition, even if a video material is to be subjected to a process such as post processing, meta data can be extracted speedily and easily from the video material obtained as a result of an editing process and used in the post processing. By monitoring a video material and meta data related to the video material at the same time, for example, the operator is capable of grasping the picture quality and movement of the video material to mention a few with a high degree of accuracy.

In addition, even if the imaging apparatus 10 is used for carrying out a shooting operation at a variable speed so that the frame rate of the recorded video signal also changes, meta data is added to the video signal of every frame. Thus, there is no discrepancy between the number of frames included in the video signal per unit time and the number of recorded pieces of meta data per unit time. As a result, even in the case of a video material shot at a variable speed as such, the video material can be correctly linked to meta data related to the video material. Therefore, it is possible to correctly extract meta data from a video signal generated in a shooting operation carried out at a variable speed and monitor the meta data at the same time as the image generated from the video signal.

In addition, meta data is put in different groups intended for different purposes of utilizing the meta data as described, and the groups are added to a video signal associated with the meta data. Thus, meta data can be extracted, renewed or subjected to other operations in group units. In this way, the amount of meta data to be extracted, renewed or subjected to other operations can be reduced by excluding unnecessary groups from the extraction, renewal or other operations. As a result, the processing efficiency can be increased. In addition, by monitoring and/or replacing only specific meta-data groups, the monitoring and/or replacement operations can be carried out easily as well as speedily.

For example, only scene-information meta data is extracted at a shooting and recording stage and displayed by superimposition of the meta data on an image so that persons such as the cameraman and the director are capable of inspecting display screens appearing on the display unit 108 employed in the imaging apparatus 10 and the display apparatus 70 and, hence, accurately grasping index information of a video material being shot and recorded or a video material reproduced from a recording medium. The index information includes a time code, a scene number and a take number.

In addition, if post processing such as a CG synthesis process is carried out at an editing stage, typically, only camera-setting meta data is extracted and displayed on a display unit employed in an edit apparatus. Thus, it is possible to grasp the picture qualities of a video material. The picture qualities include the brightness, tint and texture of the video material. By extracting typically lens-setting meta data and dolly-setting meta data and displaying them on the display unit employed in the edit apparatus, on the other hand, it is possible to accurately grasp the movement and other states, which were displayed by the imaging apparatus 10 and the shooting object during the shooting operation. In addition, by adding a comment made by persons such as the cameraman and/or the director during an operation to record a video material to scene-information meta data, for example, the shooting department, the editing department and other departments can communicate with each other about the video material. An example of the comment is a memorandum about shooting conditions.

In addition, a meta-data-synthesized video signal, which is a video signal synthesized with various kinds of meta data, can be returned to the imaging apparatus 10 as a return video signal as described above. Thus, an image with the various kinds of meta data superimposed thereon can be displayed on typically the display unit 108 employed in the imaging apparatus 10. In other words, the display unit 108 employed in the imaging apparatus 10 is capable of displaying a shot video material and meta data related to the video material by synchronizing the meta data with the video material at a frame level.

To put it concretely, information such as scene-information meta data which used to be displayed on the conventional electronic slate apparatus is synthesized with an image being shot and recorded, and a result of the synthesis is supplied to the imaging apparatus 10 as a return image. As described above, the scene-information meta data includes a time code, a scene number and a take number. Thus, the cameraman is capable of inspecting not only an image being shot, but also information such as scene-information meta data. As a result, the cameraman is capable of well carrying out a shooting operation while grasping index information of an image being shot with a high degree of accuracy.

In addition, required meta data selected from the scene-information meta data, the camera-setting meta data, the lens-setting meta data and the dolly-setting meta data can be synthesized with an image reproduced by an apparatus such as the VTR 50 after a recording operation, and a result of the synthesis can be displayed on the imaging apparatus 10 as a return image. Thus, after a shooting and recording operation, while inspecting a reproduced image displayed on the display unit 108, the cameraman is capable of confirming index information of a recorded image and grasping meta data by intuition with a high degree of accuracy. In this case, the index information includes a scene number and a take number. On the other hand, the grasped meta data includes setting information of a variety of apparatus used in an operation to shoot the image, the picture quality of the image and information on the movements of the shooting object and other apparatus. Thus, while using the various kinds of meta data as a reference, the cameraman is capable of examining the image for good points, bad points and points for improvement. Therefore, in another operation to again shoot the same scene, the cameraman is capable of properly resetting apparatus such as the imaging apparatus 10 and correctly adjusting the shooting angle and the shooting zoom by taking the meta data superimposed on the return image as a reference.

So far, the preferred embodiments of the present invention have been explained by referring to accompanying drawings. However, the configuration of the present invention is not limited to these embodiments. It is obvious that a person skilled in the art is able to think of a variety of modified and/or corrected versions within the domain of a technological concept described in the range of claims appended to this specification. Such modified and/or corrected versions are also of course considered to be versions falling in the technological range of the present invention.

For example, in the meta-data display systems 1 implemented by the first and second embodiments described above, the apparatus such as the meta-data addition apparatus 40, the imaging apparatus 10, the CCU 20 and the VTR 50 are implemented as pieces of hardware separated from each other. However, the scope of the present invention is not limited to the configuration with such separated pieces of hardware. For example, the configuration can be changed to one in which some or all of the meta-data addition apparatus 40, the imaging apparatus 10, the CCU 20 and the VTR 50 can be integrated to form a single piece of hardware.

In addition, the apparatus such as the meta-data synthesis apparatus 60 and the VTR 50 are implemented as pieces of hardware separated from each other. However, the scope of the present invention is not limited to the configuration with such separated pieces of hardware. For example, the configuration can be changed to one in which the meta-data synthesis apparatus 60 and the VTR 50 can be integrated to form a single piece of hardware.

Typical modified versions of the meta-data addition apparatus 40 and the meta-data synthesis apparatus 60 are explained by giving examples as follows.

Figure 17:
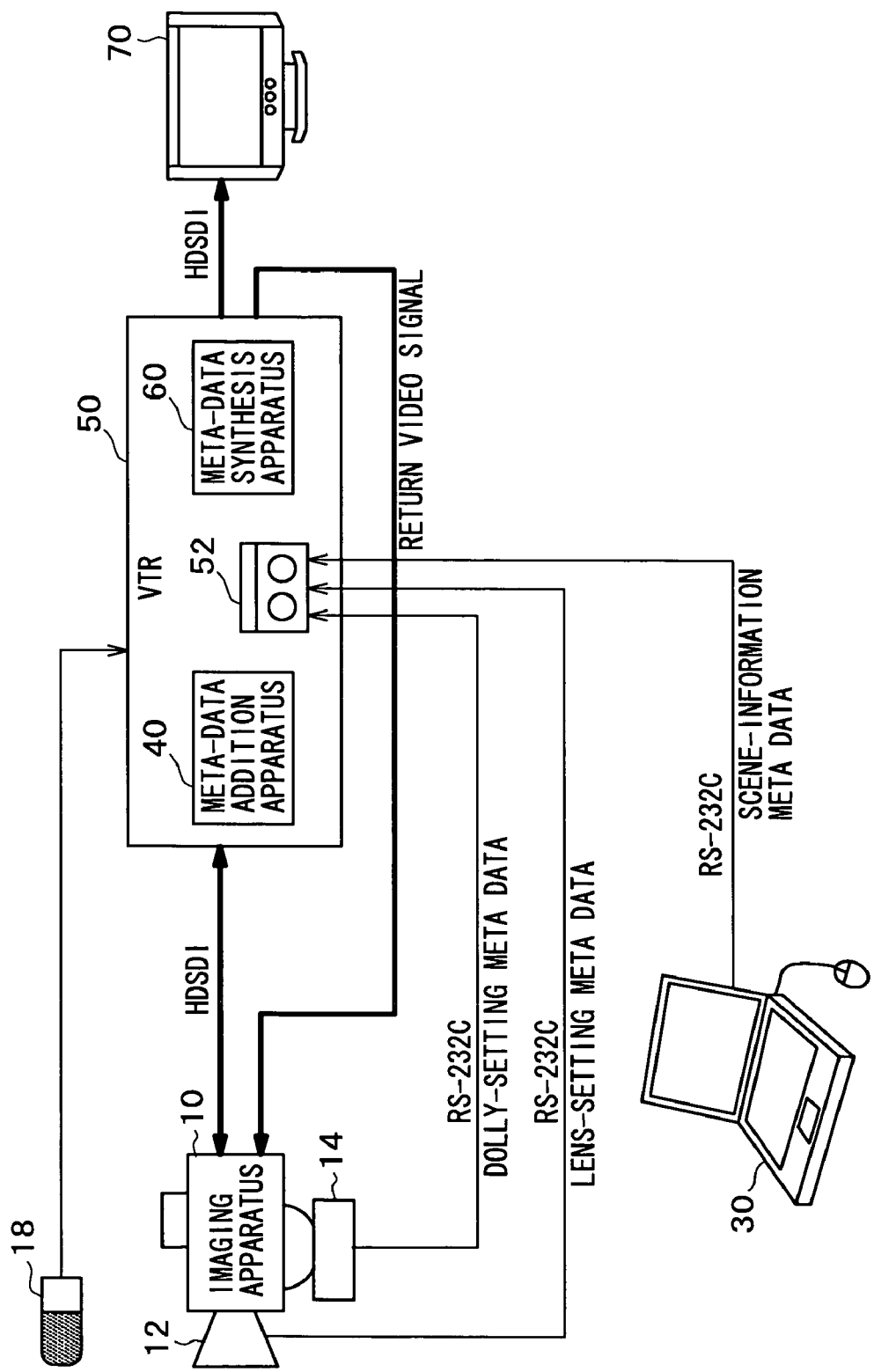
FIG. 17 is a block diagram showing a rough configuration of a meta-data display system including a first typical modified version.

First of all, the configuration of the meta-data display system 1 including a first typical modified version is explained by referring to FIG. 17. It is to be noted that FIG. 17 is a block diagram showing a rough configuration of the meta-data display system 1 including the first typical modified version.

As shown in FIG. 17, in the meta-data display system 1 including a first typical modified version, the meta-data addition apparatus 40 is embedded in the video-signal recording/reproduction apparatus such as the VTR 50. Thus, information such as the scene-information meta data, the lens-setting meta data and the dolly-setting meta data is supplied to the VTR 50 from apparatus such as the lens apparatus 12, the dolly apparatus 14 and the meta-data input terminal 30 through RS-232C cables or the like. The processing function of the meta-data addition apparatus 40 embedded in the VTR 50 is typically about the same as that of the meta-data addition apparatus 40 employed in the first embodiment. That is to say, various kinds of input meta data are grouped before being subjected to a KLV encoding process and, then, a result of the encoding process is added to the video signal of every frame.

In addition, in the meta-data display system 1 including a first typical modified version, the meta-data synthesis apparatus 60 is also embedded in the video-signal recording/reproduction apparatus such as the VTR 50. The processing function of the meta-data synthesis apparatus 60 embedded in the VTR 50 is typically about the same as that of the meta-data synthesis apparatus 60 employed in the first embodiment. The meta-data synthesis apparatus 60 is capable of extracting meta data from the video signal of every frame, decoding the extracted meta data and synthesizing a result of decoding with the video signal. As described above, the meta-data addition apparatus 40 and the meta-data synthesis apparatus 60 are integrated with the VTR 50 to form a single piece of hardware.

Next, the configuration of the meta-data display system 1 including a second typical modified version is explained by referring to FIG. 18. It is to be noted that FIG. 18 is a block diagram showing a rough configuration of the meta-data display system 1 including the second typical modified version.

As shown in FIG. 18, in the meta-data display system 1 including a second typical modified version, the meta-data addition apparatus 40 is embedded in the imaging apparatus 10. Thus, information such as the scene-information meta data, the lens-setting meta data and the dolly-setting meta data is supplied to the imaging apparatus 10 from apparatus such as the lens apparatus 12, the dolly apparatus 14 and the meta-data input terminal 30 through RS-232C cables or the like. The processing function of the meta-data addition apparatus 40 embedded in the imaging apparatus 10 is typically equivalent to a combination the processing functions of the meta-data addition unit 112 and the meta-data addition apparatus 40, which are employed in the first embodiment. As described earlier, the meta-data addition unit 112 employed in the first embodiment adds camera-setting meta data to a video signal whereas the meta-data addition apparatus 40 employed in the first embodiment adds scene-information meta data, lens-setting meta data and dolly-setting meta data to a video signal. To put it in detail, the meta-data addition apparatus 40 embedded in the imaging apparatus 10 puts typically the four different pieces of input meta data in groups and carries out a KLV encoding process on the groups. Then, a result of the encoding process is added to the video signal of every frame. Thus, as described above, the meta-data addition apparatus 40 can be embedded in the imaging apparatus 10 and, in the imaging apparatus 10, camera-setting meta data, scene-information meta data, lens-setting meta data and dolly-setting meta data can all be added to a video signal.

In addition, in the meta-data display system 1 including a second typical modified version, the meta-data synthesis apparatus 60 is also embedded in the video-signal recording/reproduction apparatus such as the VTR 50 as is the case with the first typical modified version. In this way, the meta-data synthesis apparatus 60 are integrated with the VTR 50 to form a single piece of hardware.

By having the meta-data addition apparatus 40 embedded in the VTR 50 or the imaging apparatus 10 or having the meta-data synthesis apparatus 60 embedded in the VTR 50 as described above, the number of apparatus composing the meta-data display system 1 can be reduced and the time and the labor, which are required to connect the apparatus with each other, can also be decreased as well.

In the meta-data display systems 1 including the first or second typical modified version, typically, the CCU 20 is not provided and a video signal is transmitted from the imaging apparatus 10 to the VTR 50 through an HD SDI cable or the like. In this way, the function of the CCU 20 can of course be included in the imaging apparatus 10.

In addition, the imaging apparatus 10 can also be designed as an imaging apparatus having a function to record a video signal onto a recording medium. An example of the imaging apparatus having a function to record a video signal onto a recording medium is a cam coder. It is to be noted that the configuration of such an imaging apparatus is shown in none of the figures. Provided with such a function, the imaging apparatus 10 thus has the functions of all the imaging apparatus 10, the CCU 20, the meta-data addition apparatus 40, the VTR 50 and the meta-data synthesis apparatus 60.

In the embodiments described above, lens-setting meta data generated by the lens apparatus 12 is output to the meta-data addition apparatus 40 through an RS-232C cable or the like, and added to a video signal by the meta-data addition apparatus 40. However, the configuration of the present invention is not limited to these embodiments. For example, a lens apparatus 12 capable of communicating lens-setting information to the main unit of the imaging apparatus 10 can also be employed so that the lens apparatus 12 is capable of supplying information such as lens-setting meta data directly to the main unit of the imaging apparatus 10. It is thus possible to provide a configuration in which the meta-data addition unit 112 employed in the imaging apparatus 10 is capable of adding not only camera-setting meta data but also for example lens-setting meta data received from the lens apparatus 12 to a video signal.

In addition, in the embodiments described above, the RS-232C interface is adopted as an interface for communicating information such as the various kinds of meta data among the apparatus. However, the configuration of the present invention is not limited to these embodiments. For example, the present invention may also adopt any one of a variety of other interfaces such as a USB (Universal Serial Bus), a serial SCSI (Small Computer System Interface), a serial SCSI, a GP-IB (General Purpose Interface Bus). In addition, information such as meta data and a video signal can be transmitted among the apparatus by not only wire communications as described above, but also for example radio communications.

In addition, in the embodiments described above, various kinds of meta data generated in the meta-data display system 1 are packed into four different meta-data groups, i.e., the scene-information group, the camera-setting group, the lens-setting group and the dolly-setting group. However, the configuration of the present invention is not limited to these embodiments. For example, the lens-setting group and the dolly-setting group can also be combined into one group named a lens/dolly-setting group. In addition, instead of providing all the four different meta-data groups, only one or more of the meta-segment groups may be selected.

A new meta-data group can be provided besides the four different meta-data groups mentioned above. To put it concretely, for example, an audio-information group is newly provided as a group including sound-related-information meta data such as information on a recording method and information on recorded data. The information on a recording method indicates a recording type such as stereo recording, monaural recording or surround recording. On the other hand, the information on recorded data indicates that, for example, a first microphone is used for inputting a background sound while a second microphone is used for inputting a voice of a film star.

In addition, if a plurality of imaging apparatus 10 is provided in the meta-data display system 1, a return image can be supplied to the imaging apparatus 10. The cameramen of the imaging apparatus 10 can use the start of the appearance of the return image on the display unit 108 employed in the imaging apparatus 10 as a sign to start a variety of shooting operations.

As described above, in accordance with the present invention, meta data related to a shot video material can be displayed along with the video material synchronously with the material. Thus, a person such as a cameraman is capable of confirming not only the image of the video material, but also the meta data related to the video material. In this case, the video material is a video material being shot and recorded or a video material reproduced after being once recorded.

What is claimed is:

1. A video-signal recording/reproduction apparatus comprising:
    a recording/reproduction unit for recording a video signal generated by an imaging apparatus as a video signal with every frame thereof, including additional meta data related to said video signal, onto and from a recording medium and generating a reproduced video signal including said meta data; and
    a meta-data synthesis apparatus for producing a synthesized video signal by extracting at least a part of said meta data from said reproduced video signal including said meta data added to every frame and synthesizing said extracted part with a video portion of the reproduced video signal;
    wherein said imaging apparatus receives said synthesized video signal including said meta data and displays said meta-data, from said video signal, at the imaging apparatus synchronously as the video signal is recorded by the recording/reproduction unit.

2. A video-signal recording/reproduction apparatus according to claim 1, wherein said meta data added to said video signal is packed into one or more meta-data groups provided for different purposes of utilizing said meta data.

3. A video-signal recording/reproduction apparatus according to claim 1, wherein said meta-data synthesis apparatus extracts at least a part of said meta data from said reproduced video signal reproduced by said recording/reproduction unit from said recording medium and synthesizes said extracted part with said reproduced video signal.

4. A meta-data display method for displaying meta data related to a video signal generated by an image capture apparatus, said meta-data display method comprising the steps of:
    generating said reproduced video signal including said meta data added thereto from a recording medium;
    extracting at least a part of said meta data from said reproduced video signal from said recording medium;
    extracting at least a part of said meta data added to said video signal of every frame from a reproduced video signal, containing said meta data and the video signal, and synthesizing said extracted part with said video signal; and
    displaying said synthesized meta data, from said reproduced video signal including said synthesized meta data, on a display apparatus provided in said image capture apparatus synchronously with the real-time video captured by the image capture apparatus;
    wherein
    said meta data added to said video signal includes scene-information meta data, which is meta data related to a scene shot by said image capture apparatus.

5. A meta-data display method according to claim 4, wherein said meta data added to said video signal is packed into one or more meta-data groups provided for different purposes of utilizing said meta data.

6. A meta-data display system for displaying meta-data related to a video signal, comprising:
   an imaging apparatus that captures video content and generates the video signal and meta-data associated with each frame of the video signal, and having a display adapted to display the meta-data of the captured video content synchronously with the real-time video captured by the imaging apparatus;
   a meta-data addition apparatus that receives the meta-data and the video signal and combines the meta-data associated with each frame of the video signal and the video signal, and outputs a combined video signal;
   a storage device for storing the combined video signal;
   a meta-data synthesis apparatus that synthesizes the combined video signal to produce a synthesized video signal, the synthesized video signal including the video signal where each frame is visually combined with at least a portion of the meta-data associated with that frame;
   a display for displaying the synthesized video signal synchronously with the real-time video captured by said imaging apparatus; and
   wherein the imaging apparatus receives the combined video signal from the meta-data addition apparatus, and the display on the imaging apparatus displays the meta-data from the combined video signal.

7. The meta-data display system of claim 6, wherein the display apparatus is a component of the imaging apparatus.

8. The meta-data display system of claim 6, wherein imaging apparatus includes:
   a lens system that produces lens setting meta-data;
   a positioning system that produces position meta-data, said position meta-data includes the position and orientation of the lens system relative to a scene;
   an input terminal for inputting scene-information meta-data; and
   wherein,
   the meta-data addition apparatus adds the lens setting meta-data, the position meta-data, and the scene-information meta-data to the video signal, to produce the combined video signal.

9. The meta-data display system of claim 8, wherein the meta-data received by the meta-data addition apparatus is organized into one or more meta-data groups provided for each of the lens setting meta-data, the position meta-data, and the scene-information meta-data.

10. The meta-data display system of claim 6, wherein the meta data added to the video signal is packed into one or more meta-data groups provided for different purposes of utilizing the meta-data.

11. The meta-data display system of claim 6, the meta-data display system include a video-signal recording/reproduction apparatus for recording and reproducing the combined video signal onto and from a recording medium, wherein at least a part of the meta-data is extracted from the video signal reproduced by the video-signal recording/reproduction apparatus and synthesized with the video signal.

12. A meta-data display system, comprising:
   a meta-data synthesis apparatus for extracting at least a part of the meta-data associated with every frame of a video signal and synthesizing the extracted meta-data with the video signal to produce a synthesized video signal; and
   an image capture apparatus for generating the video signal and the meta-data for every frame of the video signal;
   wherein in the synthesized video, each video frame is visually combined with meta-data associated with that video frame, and the synthesized video signal is transmitted to the imaging apparatus; and
   the image capture apparatus includes a display adapted to display the meta-data of the captured video content synchronously with the real-time video captured by the image capture apparatus.

13. The meta-data display system of claim 12, wherein the meta-data added to the video signal includes scene-information meta-data, which is meta-data related to a scene shot by the imaging apparatus.

14. The meta-data display system of claim 13, wherein the imaging apparatus includes:
   a lens system that produces lens setting meta-data;
   a positioning system that produces position meta-data, said position meta-data including the position and orientation of the lens system relative to a scene;
   an input terminal for inputting scene-information meta-data; and
   a meta-data addition apparatus adds the lens setting meta-data, the position meta-data, and the scene-information meta-data to the video signal, to produce the combined video signal.

15. The meta-data display system of claim 12, wherein the meta-data added to the video signal is packed into one or more meta-data groups for different purposes of utilizing the meta data.

* * * * *